US012809448B2

(12) United States Patent
Hirano

(10) Patent No.: US 12,809,448 B2
(45) Date of Patent: Nov. 24, 2026

(54) INFORMATION PROCESSING DEVICE, INFORMATION PROCESSING SYSTEM, INFORMATION PROCESSING METHOD, AND COMPUTER-READABLE MEDIUM

(71) Applicant: Yuuki Hirano, Kanagawa (JP)

(72) Inventor: Yuuki Hirano, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 111 days.

(21) Appl. No.: 18/670,873

(22) Filed: May 22, 2024

(65) Prior Publication Data

US 2024/0402790 A1 Dec. 5, 2024

(30) Foreign Application Priority Data

May 30, 2023 (JP) ................................. 2023-088331

(51) Int. Cl.

*G06F 1/3293* (2019.01)
*G06F 1/3234* (2019.01)
*G06F 1/3287* (2019.01)

(52) U.S. Cl.

CPC .......... *G06F 1/3293* (2013.01); *G06F 1/3284* (2013.01); *G06F 1/3287* (2013.01)

(58) Field of Classification Search

CPC ............................. G06F 1/3293; G06F 1/3287
See application file for complete search history.

(56) References Cited

U.S. PATENT DOCUMENTS

| | | | | |
|---|---|---|---|---|
| 9,354,830 | B2 * | 5/2016 | Fujisawa | G06F 3/1229 |
| 10,725,530 | B2 * | 7/2020 | Maruhashi | G06F 1/3278 |
| 2006/0236143 | A1 | 10/2006 | Kidoguchi | |
| 2011/0040992 | A1 | 2/2011 | Mizunashi | |
| 2012/0059606 | A1 * | 3/2012 | Ikari | H04N 1/00068 702/61 |
| 2012/0102351 | A1 * | 4/2012 | Tomi | G06F 1/3284 713/340 |
| 2013/0111228 | A1 * | 5/2013 | Hashimoto | G06F 1/3228 713/300 |
| 2014/0215241 | A1 * | 7/2014 | Yoon | G06F 1/3275 713/320 |

(Continued)

FOREIGN PATENT DOCUMENTS

| | | |
|---|---|---|
| JP | 2006-259906 | 9/2006 |
| JP | 2011-041152 | 2/2011 |

*Primary Examiner* — Jaweed A Abbaszadeh
*Assistant Examiner* — Cheri L Harrington
(74) *Attorney, Agent, or Firm* — XSENSUS LLP

(57) ABSTRACT

An information processing device has at least two power consumption states, and includes circuitry. The circuitry is configured to, after transfer based on a predetermined transfer factor, from a first power consumption state in which power consumption is lowest to a second power consumption state in which power consumption is higher than in the first power consumption state, calculate, for each of the predetermined transfer factor, power consumption till transfer to a different power consumption state including the first power consumption state; and display, in a display, a screen including power consumption calculated corresponding to each of the predetermined transfer factor, and one or more selecting parts for disabling transfer to the second power consumption state due to the predetermined transfer factor.

15 Claims, 20 Drawing Sheets

(56) References Cited

U.S. PATENT DOCUMENTS

| | | | | |
|---|---|---|---|---|
| 2016/0111039 | A1* | 4/2016 | Iwami | H04N 21/43637 345/520 |
| 2016/0291671 | A1* | 10/2016 | Rider | G06F 1/3209 |
| 2017/0177065 | A1* | 6/2017 | Rajwan | G06F 13/4282 |
| 2018/0181189 | A1* | 6/2018 | Megawa | H04N 1/00896 |
| 2020/0044874 | A1* | 2/2020 | Xu | G06F 1/3209 |
| 2021/0247916 | A1* | 8/2021 | Jung | G06F 1/3225 |

* cited by examiner

FIG.7

AUTOMATED RESPONSE INFORMATION MANAGEMENT TABLE

| PROTOCOL ID | RELEVANT PROTOCOL NAME | FUNCTION | DISABLING POSSIBLE/ NOT POSSIBLE | CURRENT ENABLE/ DISABLE SETTING | AUTOMATED RESPONSE INFORMATION |
|---|---|---|---|---|---|
| PR0001 | Bonjour | PRINTING FUNCTION | DISABLING POSSIBLE | ENABLE (→DISABLE) | AUTOMATED RESPONSE NOT POSSIBLE |
| PR0002 | SSDP | DEVICE SEARCH FUNCTION | DISABLING POSSIBLE | ENABLE | AUTOMATED RESPONSE NOT POSSIBLE |
| PR0003 | SNMP | STATE CONFIRMATION FUNCTION | DISABLING POSSIBLE | ENABLE | AUTOMATED RESPONSE NOT POSSIBLE |
| PR0004 | TCI/IP | PRINTING FUNCTION | DISABLING NOT POSSIBLE | ENABLE (NO DISABLING) | AUTOMATED RESPONSE NOT POSSIBLE |
| ... | ... | ... | ... | ... | ... |

FIG.8

FACTOR-BY-FACTOR TOTAL TRANSFER TIME MANAGEMENT TABLE

| PROTOCOL ID | FUNCTION | CONTROLLER STATE START DATE-TIME | CONTROLLER STATE END DATE-TIME | CONTROLLER STATE CUMULATIVE DURATION |
|---|---|---|---|---|
| PR0001 | PRINTING FUNCTION | 5/8 11:21:40 | 5/8 11:22:10 | 30 s |
| PR0002 | DEVICE SEARCH FUNCTION | 5/8 11:24:18 | 5/8 11:24:56 | 38 s |
| PR0003 | STATE CONFIRMATION FUNCTION | 5/8 11:25:05 | 5/8 11:25:41 | 36 s |
| ... | ... | ... | ... | ... |

FIG.9

SUBSTITUTE COMMUNICATION-CONTROL INFORMATION MANAGEMENT TABLE

| PROTOCOL ID | RELEVANT PROTOCOL NAME | FUNCTION | CURRENT ENABLE/ DISABLE SETTING | AUTOMATED RESPONSE INFORMATION |
| --- | --- | --- | --- | --- |
| PR0001 | Bonjour | PRINTING FUNCTION, DEVICE SEARCH FUNCTION | ENABLE (→DISABLE) | IGNORE |
| PR0002 | SSDP | DEVICE SEARCH FUNCTION | ENABLE | RESTORE MAIN SYSTEM |
| PR0003 | SNMP | STATE CONFIRMATION FUNCTION | ENABLE | RESTORE MAIN SYSTEM |
| PR0004 | ARP | DEVICE SEARCH FUNCTION | ENABLE (NO DISABLING) | AUTOMATED RESPONSE |
| ... | ... | ... | ... | ... |

INFORMATION PROCESSING DEVICE, INFORMATION PROCESSING SYSTEM, INFORMATION PROCESSING METHOD, AND COMPUTER-READABLE MEDIUM

CROSS-REFERENCE TO RELATED APPLICATION

The present application claims priority under 35 U.S.C. § 119 to Japanese Patent Application No. 2023-088331, filed on May 30, 2023. The contents of which are incorporated herein by reference in their entirety.

BACKGROUND OF THE INVENTION

1. Field of the Invention

The present invention relates to an information processing device, an information processing system, an information processing method, and a computer-readable medium.

2. Description of the Related Art

Conventionally, a technique is known that, in the state in which there is no operation performed with respect to a device or there is no reception of signals by the device for a certain duration, lowers the power consumption of that device and enables achieving power saving.

For example, in a communication device (MFP) that includes a subsystem and a main system with the aim of maintaining the power saving state in an appropriate manner, when a specific received packet is received using automated response information with the aim of maintaining the power saving state, a technique is known by which a substitute response is given using the subsystem without restoring the main system (refer to Japanese Unexamined Patent Application Publication No. 2011-041152).

However, in the conventional technique, in the case of transfer from a first power consumption state in which the power consumption is the lowest to a second power consumption state in which the power consumption is higher than in the first power consumption state, in spite of the fact that the transfer to the second power state is sometimes disabled depending on the transfer factor, that fact is not taken into account.

SUMMARY OF THE INVENTION

According to an aspect of the present invention, an information processing device has at least two power consumption states, and includes circuitry. The circuitry is configured to, after transfer based on a predetermined transfer factor, from a first power consumption state in which power consumption is lowest to a second power consumption state in which power consumption is higher than in the first power consumption state, calculate, for each of the predetermined transfer factor, power consumption till transfer to a different power consumption state including the first power consumption state; and display, in a display unit, a screen including power consumption calculated corresponding to each of the predetermined transfer factor, and one or more selecting parts for disabling transfer to the second power consumption state due to the predetermined transfer factor.

BRIEF DESCRIPTION OF THE DRAWINGS

FIG. 7 is a conceptual diagram illustrating an example of an automated response information management table;

FIG. 8 is a conceptual diagram illustrating an example of a factor-by-factor transfer time management table;

FIG. 9 is a conceptual diagram illustrating an example of a substitute communication-control information management table;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
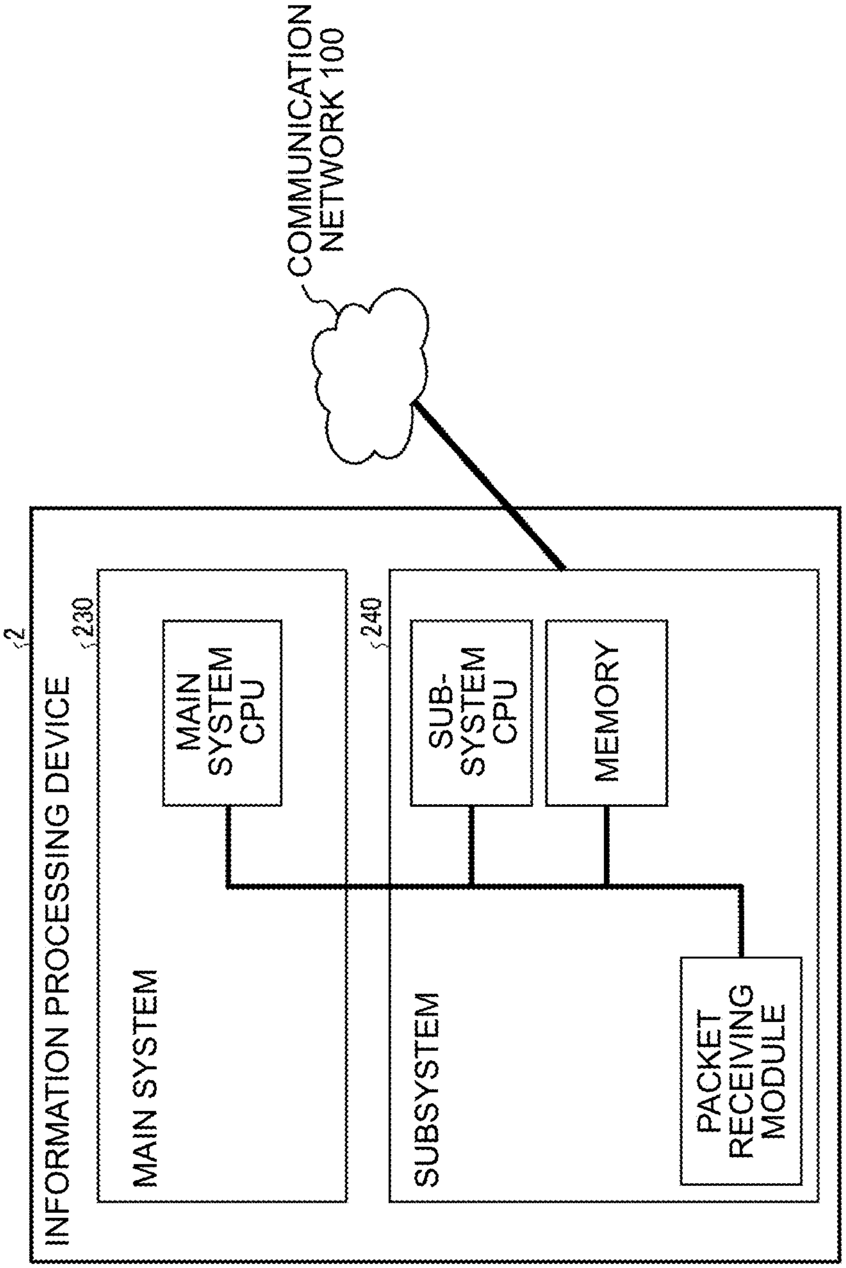
FIG. 1 is a diagram illustrating an exemplary overall configuration of an information processing device according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

Exemplary embodiments of the present invention are described below with reference to the accompanying drawings. In the explanation with reference to the drawings, identical constituent elements are referred to by the same reference numerals, and their explanation is not given in a repeated manner.

First Embodiment

Overall Configuration of Information Processing Device

FIG. 1 is a diagram illustrating an exemplary overall configuration of an information processing device according to a first embodiment. As illustrated in FIG. 1, an information processing device 2 includes: a main system 230 including a main system CPU; and a subsystem 240 including a subsystem CPU, a memory, and a packet receiving module. Moreover, the information processing device 2 has at least two power consumption states. Regarding the power consumption states, the detailed explanation is given later. In the information processing device 2, the subsystem 240 is equipped with the packet communication function for receiving predetermined communication packets (frames) from the devices or the communication terminals connected via a communication network 100 and for performing communication. Regarding the hardware configuration and the functional configuration of the main system 230 and the subsystem 240, the detailed explanation is given later. Meanwhile, in the following description of the first embodiment, a "communication packet (frame)" is sometimes referred to as a "packet" as a matter of convenience.

Information Processing Device

The information processing device 2 has at least power consumption states. The information processing device 2 is, for example, a commonly-used MFP (Multifunction Peripheral/Product/Printer); and forms images on a print medium either based on an operation panel that receives various user settings, or based on the original that has been read, or based on the input image data that is input.

In the first embodiment, the information processing device 2 is considered to be an MFP. However, as long as a device can make a transition among different power modes and can make a transition (transfer) to a power saving state as a result of receiving a network protocol, there is no particular restriction on the type of the device. For example, a network server device such as a PC can also be used as the information processing device 2.

Transition of Power Consumption State

Figure 2:
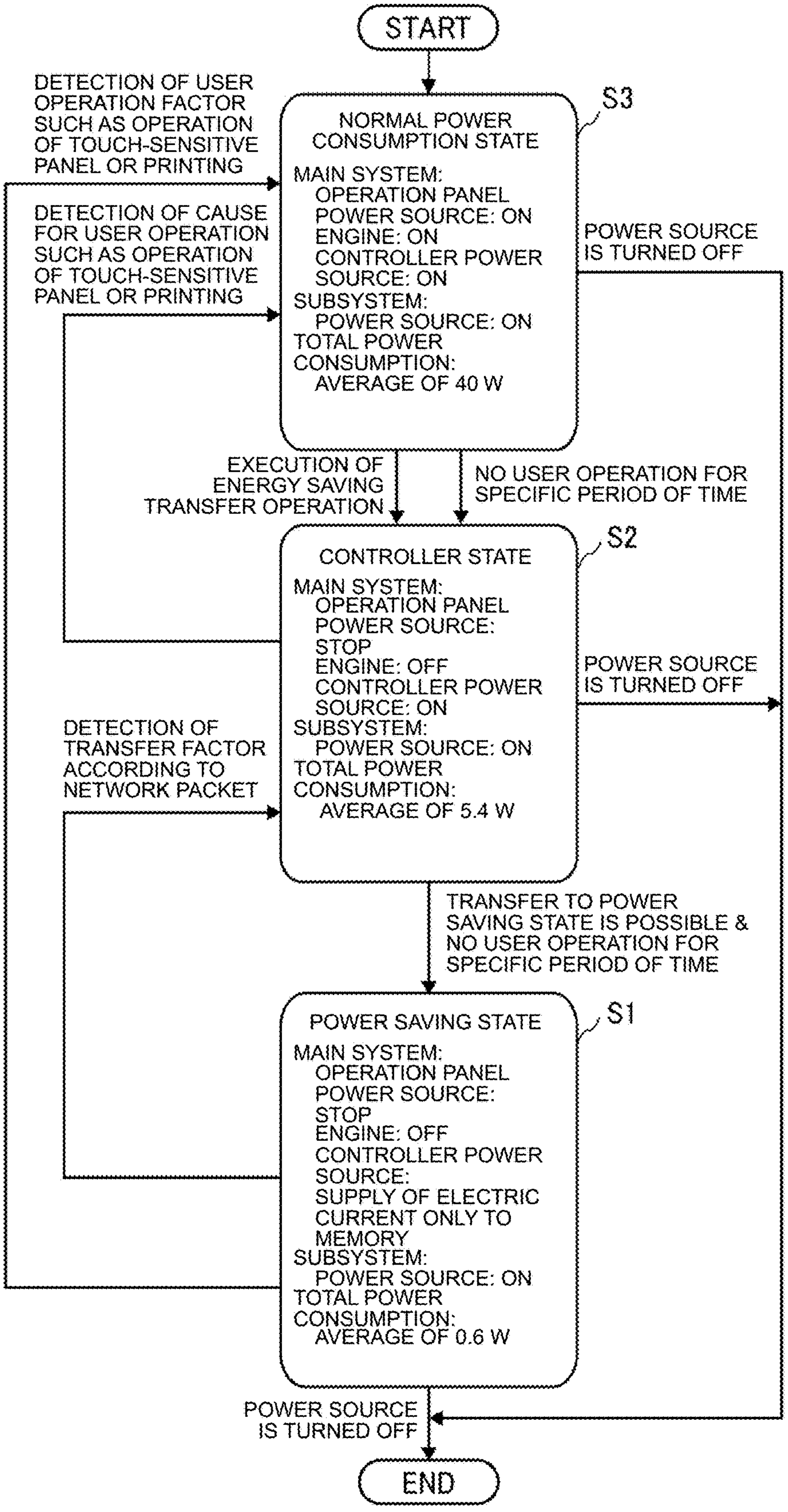
FIG. 2 is a diagram illustrating an example of the transition of the power consumption state.

Given below is the explanation about the transition of the power consumption state. FIG. 2 is a diagram illustrating an example of the transition of the power consumption state.

Firstly, as illustrated by "START", when the power is turned on in the power-off state, the information processing device 2 makes a transition to a normal power consumption state (S3) in which the power consumption per unit time is the highest.

In the normal consumption power state (S3), an operation panel power source, which is installed in the information processing device 2, is turned on so as to enable the user to operate the operation panel. Moreover, an engine is also turned on so as to enable immediate implementation of the printing function and the photocopying function. Furthermore, a controller power source for operating the main system is also turned on, and the power of the subsystem is also turned on because the subsystem has to transfer received packets to the main system. The total power consumption in the normal power consumption state (S3) is the highest. As an example, in the normal power consumption state (S3), the power consumption per second is equal to an average of 40 (W/s). At that time, if the power is turned off, then the information processing device 2 makes a transition to the power-off state.

In the normal power consumption state (S3), when the user presses a power-saving transfer button in the operation panel or when no user operation is performed for a certain period of time, the information processing device 2 closes the unused functions and makes a transition to a controller state (S2) in which only the controller is in the operating state. Herein, the premise is that the power consumption per unit time in the controller state (S2) is lower than in the normal power consumption state (S3).

In the controller state (S2), since the user does not perform any operations using the operation panel, the operation panel power source is in the stop state. Moreover, since the printing function or the photocopying function need not be immediately implemented, an engine 210 is turned off. Furthermore, the controller power source is turned on for enabling operation of the main system, and the power of the subsystem is also turned on because the subsystem has to transfer received packets to the main system. The total power consumption in the controller state (S2) is the second highest. As an example, in the controller state (S2), the power consumption per second is equal to an average of 5.4 (W/s). At that time, if the power is turned off, then the information processing device 2 makes a transition to the power-off state.

In the controller state (S2), when the reason for a user operation such as an operation of the operation panel or printing is detected, the information processing device 2 turns on the operation panel power source and turns on the engine 210, and makes a transition to the normal power consumption state (S3). Meanwhile, when it is possible to make a transition to a power saving state (S1) in which the power consumption per unit time is lower than in the controller state (S2) (i.e., when no operation is performed on the operation panel or when the printing function is not implemented) and when no user operation is performed for a certain period of time, the information processing device 2 makes a transition to the power saving state (S1). More specifically, the information processing device 2 stores, in the main memory of the main system, the information required for a transfer from the power saving state (S1) to the controller state (S2), and makes a transition to the power saving state (S1) while supplying the electric current only to the memory.

In the power saving state (S1), the operation panel power source reaches the stop state. Moreover, the engine 210 is turned off, and the controller power source makes a transition to the state in which electric current is supplied only to the memory. In the subsystem, the power is turned on in order to enable determination of the packets that contributed to the transfer, enable automated response of the packets, and enable destruction of the packets. At that time, since the main controller that consumes a large amount of electric power is in the stop state, the total power consumption of the information processing device 2 is at the lowest. As an example, in the power saving state (S1), the power consumption is equal to an average of 0.6 (W/s). At that time, if the power is turned off, then the information processing device 2 makes a transition to the power-off state.

In the power saving state (S1), when the reason for a user operation such as an operation of the operation panel or printing is detected, the information processing device 2 turns on the operation panel power source and turns on the engine 210, and makes a transition to the normal power consumption state (S3). Meanwhile, in the power saving state (S1), when the transfer factor is detected according to a network packet, the information processing device 2 makes a transition to the controller state (S2), in which the power consumption per unit time is higher than in the power saving state (S2) but is lower than in the normal power consumption state (S3), in order to execute the processing of that network packet in the main system.

There are times when the information processing device 2 is connected to a communication network and is kept in the power-on state for long periods of time in an office environment. In that regard, in the first embodiment, the information processing device 2 is provided that, in a time slot in which the user does not use the information processing device 2, reduces the transfers according to network packets as much as possible and achieves power saving of the entire device by maintaining the power saving state (S1).

Transition of Power Consumption

Figure 3:
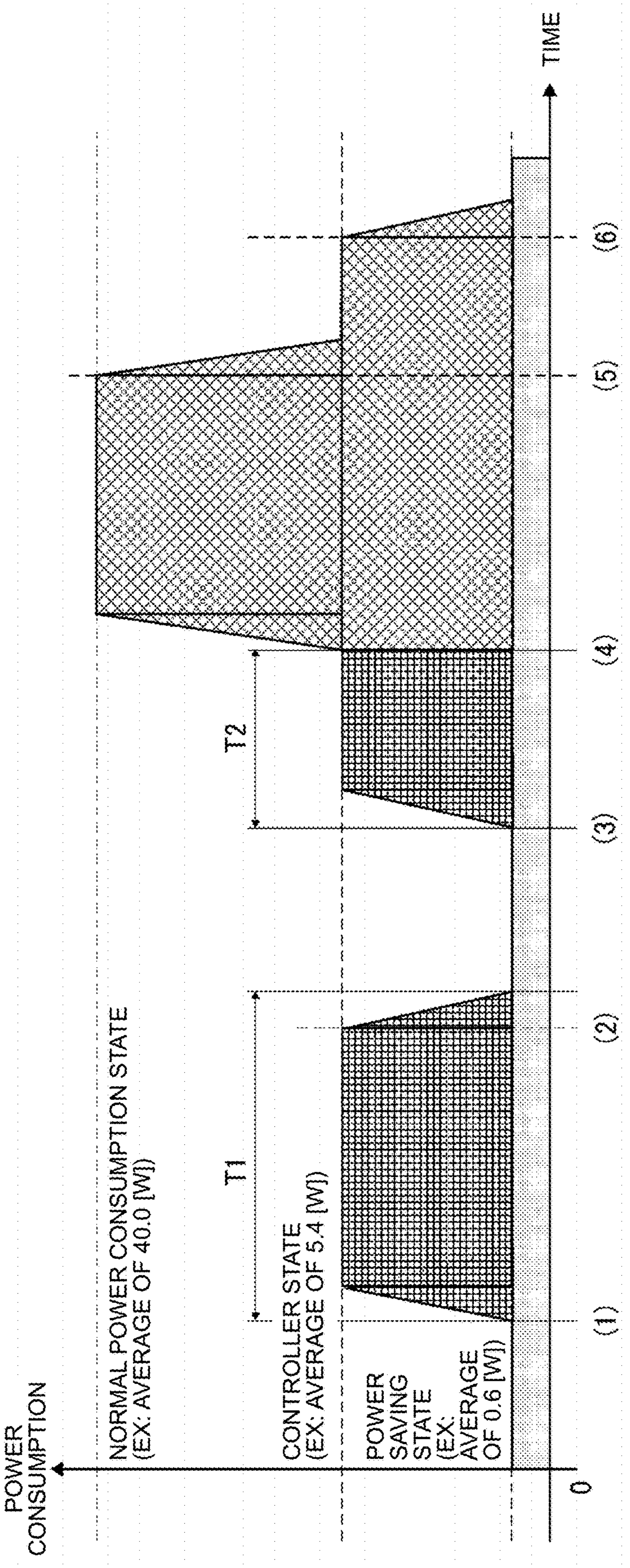
FIG. 3 is a diagram illustrating an example of the transition of the power consumption.

Given below is the explanation about the transition of the power consumption. FIG. 3 is a diagram illustrating an example of the transition of the power consumption. In FIG. 3 is illustrated a state transition diagram of the power consumption, which is illustrated in FIG. 2, from the perspective of the time and the power consumption.

On the time axis, at the point of time of a timing 0, the information processing device 2 has the power consumption equal to an average of 0.6 (W) in the power consumption state (S1) representing an example of a first power consumption state.

From the timing 0 to a timing (1), the information processing device 2 maintain the power saving state (S1).

At the timing (1), the information processing device 2 receives network packets of Bonjour representing the transfer factor and makes a transition to the controller state (S2) representing an example of a second power saving state. At that time, the power consumption equal to (0.6 (W))×(timing (1)) (the area of a rectangle of light gray color) happens to be the power consumption of the information processing device 2.

From the timing (1) to a timing (2), the controller state (S2) is maintained and at the timing (2) that arrives after the elapse of a predetermined period of time without the occurrence of any user operation, the information processing device 2 again makes a transition to the power saving state (S1). At that time, the grid portion between the timings (1) and (2) indicates the controller state (S2) and, in this example, has the power consumption equal to an average of 5.4 (W).

In the first embodiment, the period of time from the timing (1), at which there is a transfer from the power saving state (S1) to the controller state (S2), to the timing (2), which arrives after the elapse of a specified period of time without the occurrence of any user operation; and (Equation 1) given below is obtained.

$$(5.4[W]-0.6[W])\times(\text{Timing }(2)-\text{Timing }(1)) \quad \text{(Equation 1)}$$

That is, the electrical energy obtained using the area of the rectangle of the grid portion is treated as the electrical energy that would have enabled power saving if the function of power-saving restoration factor packets was disabled. As far as the packets sent and received in the network environment are concerned, the types, the count, and the probability differs according to the network environment. For that reason, the disabling which network protocol enables achieving a profound power saving effect differs according to the network environment.

Subsequently, the period of time from the timing (2) to a timing (3) indicates the power saving state (S1). Meanwhile, regarding the variation portion of the state transition at each timing (i.e., the rising and the falling), the triangle schematically indicates the temporal variation in the actual state transition of the information processing device 2. For that reason, as illustrated in FIG. 3, a time period T1 can be set to include the period of time from the start of rising of the timing (1) till the end of falling of the timing (2). On the other hand, a time period T2 can be set to include the period of time from the start of rising of the timing (3) till the start of rising of a timing (4).

At the timing (3), the information processing device 2 again receives network packets of Bonjour representing the transfer factor and makes a transition to the controller state.

At the timing (4), a transfer trigger, such as a user operation of the operation panel or the printing function, occurs for triggering transition to the normal power consumption state (S3). At that time, the period of time from the timing (3) to the timing (4) is recorded and (Equation 2) given below is obtained.

$$(5.4[W]-0.6[W])\times(\text{Timing }(4)-\text{Timing }(3)) \quad \text{(Equation 2)}$$

That is, the electrical energy obtained using the area of the rectangle of the grid portion is treated as the electrical energy that would have enabled power saving if the function of power-saving restoration factor packets was disabled.

The time period from the timing (4) to a timing (5) indicates the normal power consumption state (S3). In this example, the power consumption is equal to an average of 40 (W). Without the occurrence of a user operation for a specified period of time, the transition to the controller state (S2) starts at the timing (5).

The period of time from the timing (5) to a timing (6) Indicates the controller state (S2). In this example, at the timing (6) that arrives at the elapse of a specified period of time without the occurrence of a user operation, the information processing device 2 again makes a transition to the power saving state (S1).

In the first embodiment, for each type of network protocol, the total area (or the total period of time) of the rectangle of the grid portion illustrated in FIG. 3 is measured for each unit time such as each date. As a result, it becomes possible to calculate the extent of reduction achieved in the power consumption per day as a result of disabling a particular network protocol.

Regarding Terms

In the first embodiment, the term "power consumption state" implies the stage of the power consumption (electrical energy) in the information processing device 2. In the information processing device 2, examples of the stage of the power consumption (electrical energy) include the "power saving state" in which the power consumption is the lowest and which represents an example of the first power consumption state. Moreover, in the information processing device 2, there exists the "controller state" in which the power consumption is higher than in the "power saving state" and which represents the second power consumption state. Furthermore, in the information processing device 2, there exists the "normal power consumption state" in which the power consumption is higher than in the "controller state" and which represents an example of a different power consumption state (a third power consumption state).

Moreover, in the first embodiment, the term "transfer" includes the meaning of "transition" among a plurality of power consumption states and includes the meaning of "restoration" of the "controller state" from the "power saving state".

Hardware Configuration

Figure 4:
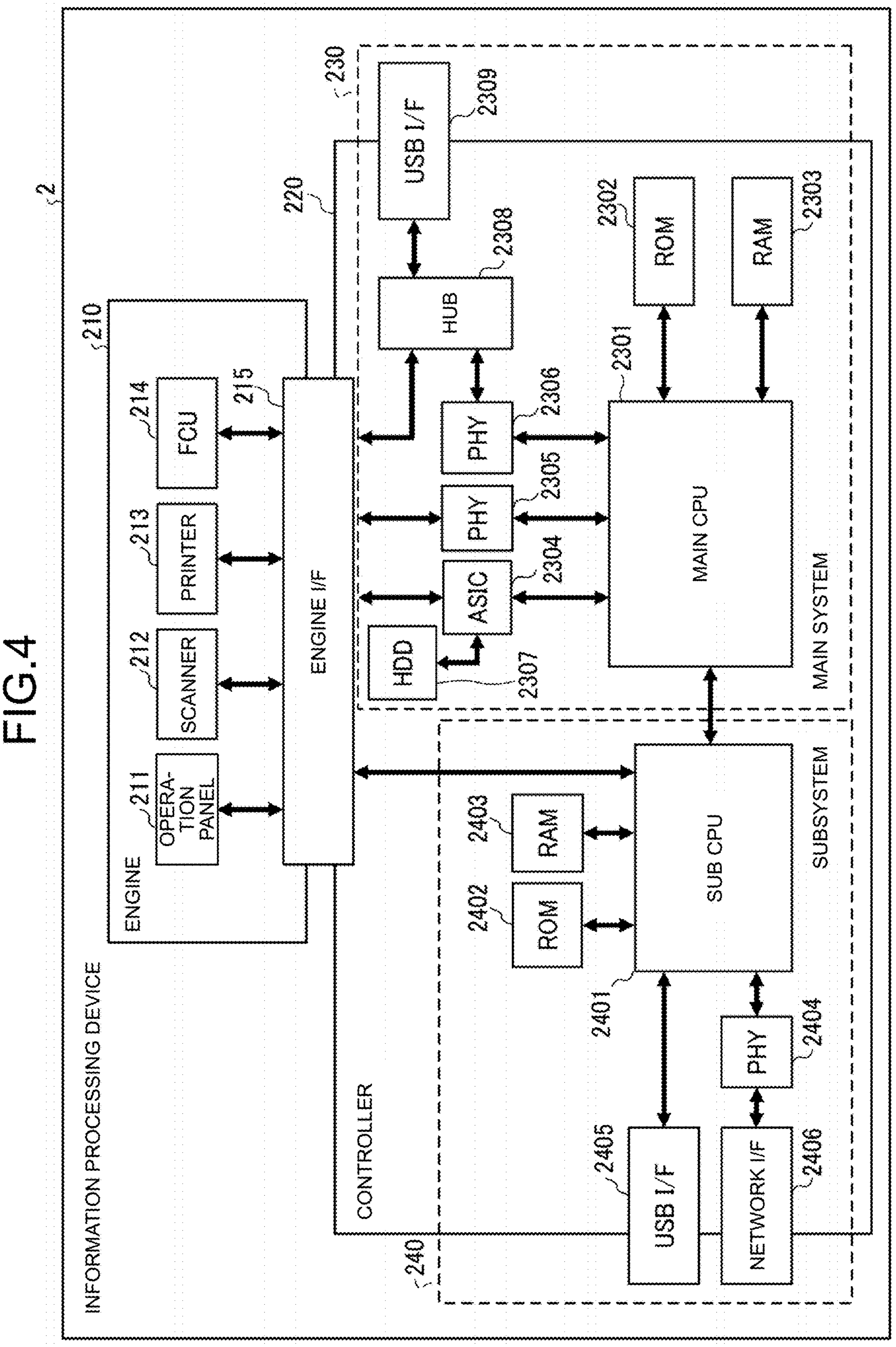
FIG. 4 is a diagram illustrating an exemplary hardware configuration of the information processing device.

Explained below with reference to FIG. 4 is a hardware configuration of the information processing device according to the first embodiment. In the hardware configuration of a device or a communication terminal as illustrated in FIG. 4, constituent elements can be added or deleted as may be necessary.

Hardware Configuration of Information Processing Device

FIG. 4 is a diagram illustrating an exemplary hardware configuration of the information processing device. As illustrated in FIG. 4, the information processing device 2 is, for example, an MFP (Multi-Function Peripheral). The information processing device 2 includes the engine 210 and a controller 220. The engine 210 and the controller 220 are connected to each other via an engine I/F 215. In the controller 220, a main CPU 2301 and a sub CPU 2401 are installed. The main CPU 2301 is the CPU running in the main system. The sub CPU 2401 is the CPU running in the sub-system. The main CPU 2301 and the sub CPU 2401 are connected to each other via an internal bus (illustrated by an arrow in FIG. 4).

The main system 230 represents a group of hardware components that control the information processing device 2 in the normal power consumption state (S3). The subsystem 240 represents a group of hardware components that control the information processing device 2 in the power saving state (S1).

As explained earlier, the power saving state (S1) implies the state in which, due to the continuance of the non-operating state, the electric power is supplied only to the subsystem 240 in order to reduce the power consumption. Moreover, the power saving state (S1) implies the state in which the supply of electric power to the main system 230 and the engine 210 is cut down. The power saving state (S1) is generally also called the power saving mode, the energy saving mode, or the minimum power state. The normal power consumption state (S3) is the power consumption state other than the power saving state (S1) and the controller state (S2) explained above. That is, in the normal power consumption state (S3), there is no restriction on the supply of electrical power to the main system 230, the subsystem 240, and the engine 210.

The engine 210 includes an operation panel 211, a scanner 212, a printer 213, and an FCU (Facsimile Control Unit) 214. In the first embodiment, the operation panel 211 represents an example of a display unit configured using a liquid crystal panel. Moreover, the operation panel 211 represents an example of an input unit including hardware keys. The scanner 212 scans an original and inputs the scanned image data to an ASIC 2304 via the engine I/F 215. The printer 213 prints the image data, which is input to the ASIC 2304 via the engine I/F 215, onto a print sheet. The FCU 214 sends and receives facsimiles via a commonly-used public line.

In the main system 230, the main CPU 2301 is connected to a ROM 2302, a RAM 2303, the ASIC (Application Specific Integrated Circuit) 2304, and PHY chips 2305 and 2306 via internal buses. The main CPU 2301 controls the functions of the entire information processing device 2 based on computer programs that are recorded in the ROM 2302 and loaded in the RAM 2303. The ASIC 2304 mainly performs image processing. The ASIC 2304 is connected to an HDD 2307 and the engine I/F 215 via internal buses. The PHY chips 2305 and 2306 convert the logic signals, which are received from the main CPU 2301, into electrical signals, and inputs the electrical signals to the engine I/F 215. The PHY chips 2305 and 2306 convert the logic signals, which are received from the main CPU 2301, into electrical signals and inputs the electrical signals to a hub 2308. The hub 2308 is connected to the USB I/F 2309 and the engine I/F 215 via internal buses. The USB I/F 2309 is a hardware interface for establishing USB connection. Meanwhile, the PHY chips 2305 and 2306 can alternatively be configured using a single chip.

In the subsystem 240, the sub CPU 2401 is connected to a ROM 2402, a RAM 2403, a PHY chip 2404, and a USB I/F 2405 via internal buses. The sub CPU 2401 controls the operations (mainly the communication operation) of the information processing device 2 in the power saving state based on computer programs recorded in the ROM 2402 and loaded in the RAM 2403. The PHY chip 2404 converts the logic signals, which are received from the sub CPU 2401, into electrical signals and input the electrical signals to the network I/F 2406. The network I/F 2406 is, for example, a hardware component for establishing connection to a network such as a LAN (Local Area Network), and implements the functions of the physical layer in the network communication.

Meanwhile, the computer programs can be recorded as installable files or executable files in a computer-readable printing medium, or can be distributed in a downloadable manner via a network. Examples of the printing medium include a CD-R (Compact Disc Recordable), a DVD (Digital Versatile Disk), a Blu-ray Disc (Blu-ray is a registered trademark, which is not mentioned again hereinafter), an SD card, and a USB memory. Moreover, the printing medium can be provided as a program product either domestically or internationally. For example, the information processing device 2 executes the computer program according to the present invention and implements an information processing method according to the present invention.

Functional Configuration

Figure 5:
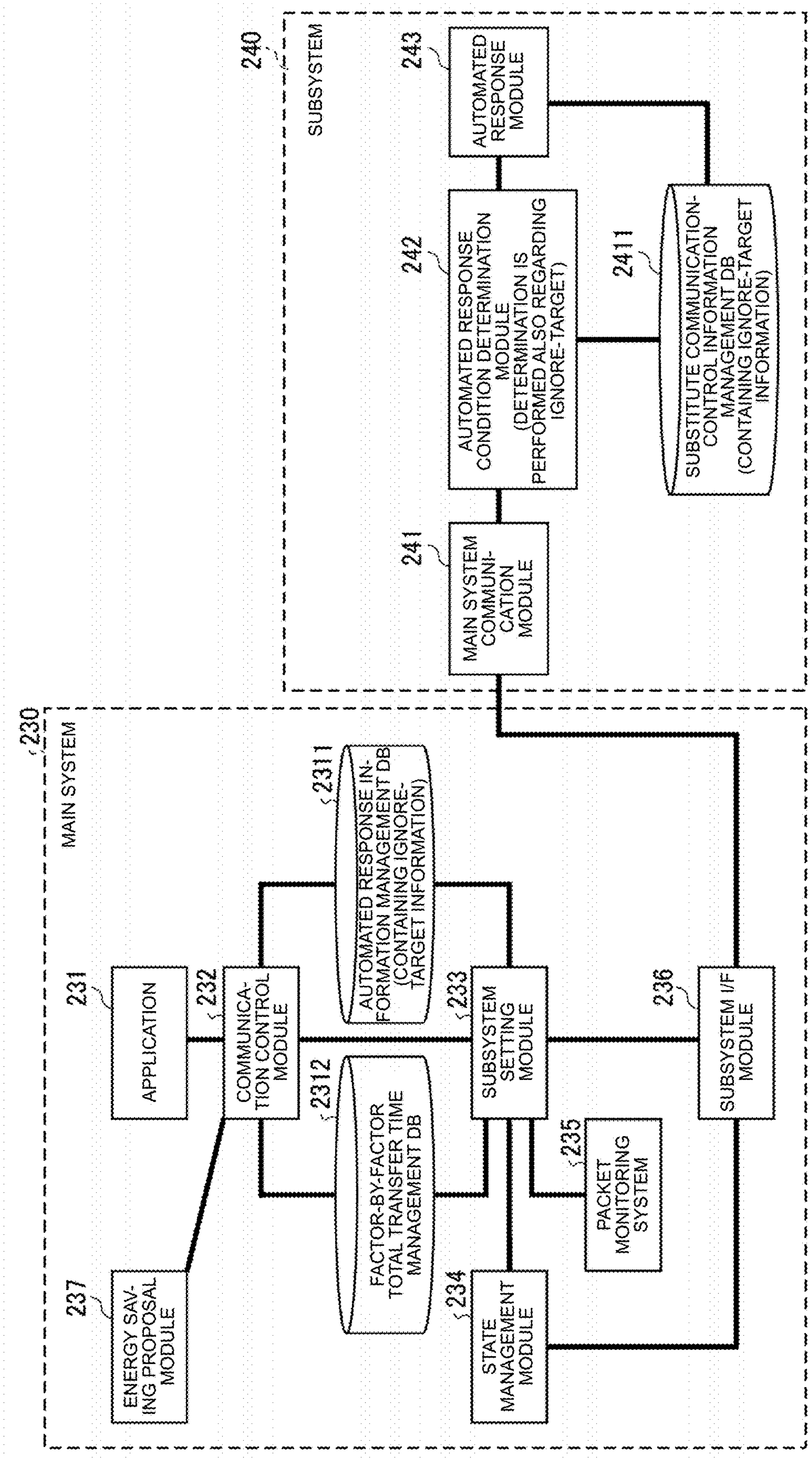
FIG. 5 is a diagram illustrating an exemplary functional configuration of the information processing device according to the first embodiment.

Explained below with reference to FIGS. 5 to 9 is a functional configuration according to the first embodiment. FIG. 5 is a diagram illustrating an exemplary functional configuration of the information processing device according to the first embodiment. In FIG. 5 are illustrated those constituent elements of the information processing device illustrated in FIG. 1 which are involved in the processing or the operations explained below.

Functional Configuration of Information Processing Device

Firstly, explained below with reference to FIG. 5 is a functional configuration of the information processing device 2. As illustrated in FIG. 5, the main system 230 in the information processing device 2 includes function modules or program modules such as an application 231, a communication control module 232, a subsystem setting module 233, a state management module 234, a packet monitoring module 235, a subsystem I/F module 236, and an energy saving proposal module 237.

The function modules or the program modules are recorded in the ROM 2302 and are loaded in the RAM 2303. Each program module loaded in the RAM 2303 causes the main CPU 2301 to execute the corresponding processing sequence, so that the corresponding function gets implemented. Meanwhile, the main system 230 includes a main memory unit built using at least either the ROM 2302 or the HDD 2307 illustrated in FIG. 4.

Functional Configuration of Main System

The communication control module 232 is a computer program that provides the network communication control function to applications. The communication control module 232 is available for each protocol (each protocol of the application layer). For example, for each of the SNMP (Simple Network Management Protocol), the Bonjour protocol, and the WSD (Web Services on Devices) protocol; a communication control module is available for executing the operation according to the concerned communication protocol. Meanwhile, the information processing device 2 can be arbitrarily installed (added) in or uninstalled (removed) from the information processing device 2.

The subsystem setting module 233 collects automated response information from each communication control module and sets substitute communication-control information, which contains the automated response information that has been collected, in the subsystem 240 via the subsystem I/F module 236. The automated response information contains the conditions enabling identification of the received data (received packets) that cause the subsystem 240 to execute the responses in place of the communication control module 232, and contains the data included in the responses by the subsystem 240 (i.e., contains response data). In the first embodiment, a substitute response given by the subsystem 240 in the power saving state (S1) is referred to as an “automated response”. The automated response information that is collected from each communication control module 232 has a unique value for the concerned communication control module 232. Meanwhile, in the case of restoring the main system 230 only according to some specific received data (received packets), that information can also be included in the automated response information. For example, in the case of restoring the main system 230 when predetermined multicast addresses represent the destinations in the received data (received packets), the list of multicast addresses serves as the information to be included in the automated response information.

Moreover, in the case in which the function of the communication protocol for restoring the main system 230 is disable, the information enabling ignoring the concerned packet without restoring the main system 230 can also be included in the automated response information. Using that information, it is determined whether or not the function of the packet can be disabled. In that case, even when a packet is to considered for automated response, if it is not to be considered as a factor for restoration of the main system 230, then that packet is ignored. Regarding an automated response information management DB 2311 that is used for managing the automated response information, the detailed explanation is given later.

Meanwhile, the communication control module 232, which controls the communication protocol for restoring the main system 230 that can be disabled, records and holds the factor-by-factor total transfer time regarding a latest specific period of time. The factor-by-factor total transfer time indicates the period of time for which, when the transfer occurs from the power saving state (S1) to the controller state (S2) due to the fact that the concerned communication protocol is enabled, the power saving state (S1) is estimated to have been maintained if that communication protocol was kept disabled. Moreover, the communication control module 232 identifies the types of the packets representing the transfer factor, and determines whether or not, regarding the function assigned to each assigned type, it is possible to disable the transfer from the power saving state (S1) to the controller state (S2). In the first embodiment, the communication control module 232 represents an example of a determining unit.

For example, since the mDNS (Bonjour) function representing the transfer factor is enabled, the factor-by-factor total transfer time is equal to the period of time required between the reception of an mDNS (Bonjour) packet by the main system 230 for transfer and the next transfer to the power saving state. Moreover, the factor-by-factor total transfer time is equal to the period of time required between the reception of an mDNS (Bonjour) packet by the main system 230 for transfer and the prevention of the transfer to the power saving state due to a user operation such as a print job issuance or a panel touch. Meanwhile, the information processing device 2 can measure the factor-by-factor total transfer time for a specific period of time (for example, seven days) and obtains the average factor-by-factor total transfer time per day. Regarding a factor-by-factor total transfer time management DB 2312 that is used for managing the period of time associated to the factor-by-factor total transfer time, the detailed explanation is given later.

Meanwhile, the communication control module 232 has the function of storing various setting values in the automated response information management DB 2311 (explained later) and the factor-by-factor total transfer time management DB 2312 (explained later), and reading those setting values.

The state management module 234 performs, for example, determination about transfer to the power saving state (S1), transfer to the power saving state (S1), and transfer from the power saving state (S1). For example, if it is detected that a non-operating state with respect to the information processing device 2 has gone on for a predetermined period of time, then the state management module 234 determines that there should be transfer to the power saving state. According to that determination, the state management module 234 enquires to the communication control modules 232 and other modules about whether or not it is possible to transfer to the power saving state.

The packet monitoring module 235 monitors the received data (received packets) that is received in the information processing device 2 via a communication network and, for each set of automated response information, counts the number of times of receiving the received data that satisfies the conditions specified in the automated response information.

The subsystem I/F module 236 provides an interface for communicating with the subsystem 240.

The energy saving proposal module 237 obtains the factor-by-factor total transfer time from each communication control module 232; proposes to the user about the extent of power saving that can be maintained per day by disabling the concerned communication protocol and about the functions that cannot be used when the communication protocol is disabled; and provides a UI (User Interface) for enabling the user to disable the concerned communication protocol.

Functional Configuration of Energy Saving Proposal Module

Figure 6:
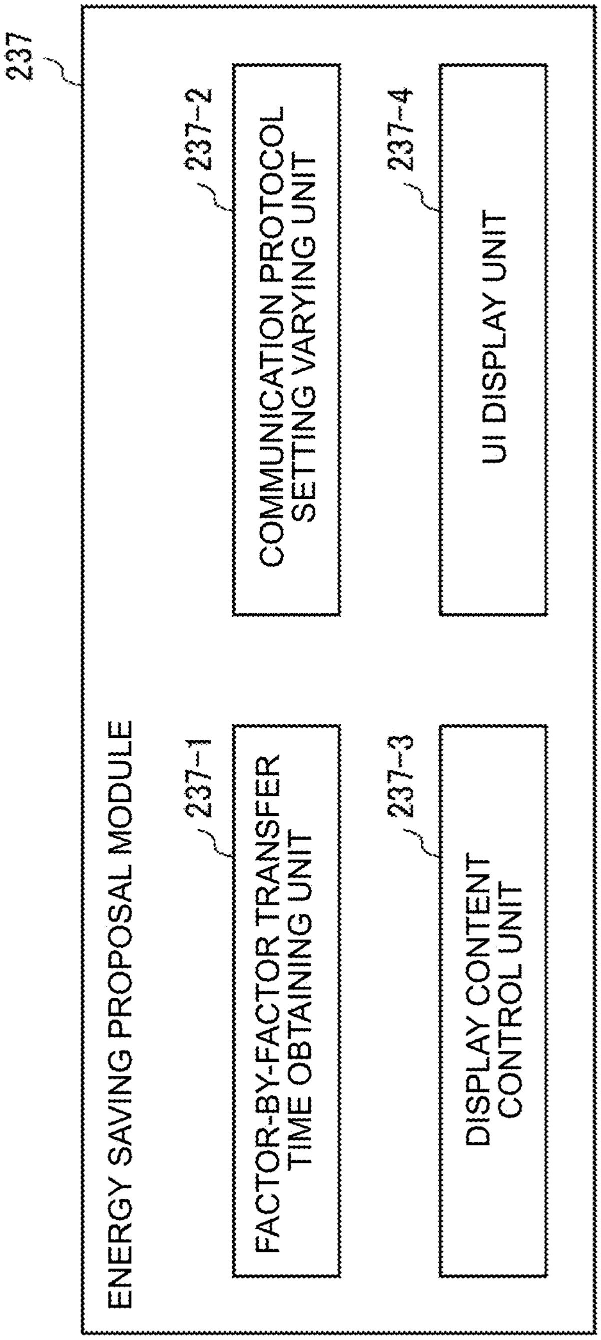
FIG. 6 is a conceptual diagram illustrating an example of an energy saving proposal module of the information processing device.

Given below is the explanation about of the functional configuration of the energy saving proposal module 237. FIG. 6 is a conceptual diagram illustrating an example of the energy saving proposal module of the information processing device. The energy saving proposal module 237 obtains the factor-by-factor total transfer time from each communication control module 232, and disables the corresponding communication protocol. With that, the energy saving proposal module 237 proposes to the user about the extent of power saving that can be maintained per day and about the functions that cannot be used when the communication protocol is disabled; and provides a UI for enabling the user to disable the concerned communication protocol.

The energy saving proposal module 237 is configured with a factor-by-factor transfer time obtaining unit 237-1, a communication protocol setting varying unit 237-2, a display content control unit 237-3, and a UI display unit 237-4.

The factor-by-factor transfer time obtaining unit 237-1 obtains the factor-by-factor total transfer time via the communication control module 232.

The communication protocol setting varying unit 237-2 obtains the setting about enable/disable the present communication protocol, and varies the settings according to the setting about enable/disable as selected by the user.

Based on the energy-saving-restoration factor packet (a received packet, an example of a predetermined transfer factor), the display content control unit 237-3 calculates, for each transfer factor to the controller state (S2), the power consumption: after the transfer from the power saving state (S1) (an example of the first power consumption state), in which the power consumption is the lowest, to the controller state (S2) (an example of the second power consumption state), in which the power consumption is higher than in the power saving state (S1), from among the power consumption states; and till the transfer to a different power consumption state including the power saving state (S1). More particularly, from among the network protocols that are currently enabled and that can be expected to provide the energy saving effect when disabled, the display content control unit 237-3 disables the concerned function starting from the time obtained from the factor-by-factor transfer time obtaining unit 237-1, and calculates the energy saving effect per unit time. Moreover, at the time of transfer from the power saving state (S1) to the controller state (S2), the display content control unit 237-3 starts calculating the power consumption regarding the function of each of one or more network protocols; and ends the calculation of the power consumption at the time of transfer from the controller state (S2) to another power state. Furthermore, for each transfer factor, the display content control unit 237-3 calculates the following: the first power consumption during the transfer from the power saving state (S1) to the controller state (S2); the second power consumption in the controller state (S2); and the third power consumption till transfer from the controller state (S2) to a different power consumption state including the power saving state (S1) (i.e., to the normal power consumption state (S3)).

Herein, the first power consumption implies the power consumption in the power saving state (S1) (in the transitions illustrated in FIG. 3, the power consumption indicated by the area of a rectangle of light gray color). The second power consumption implies the power consumption in the controller state (S2) (in the transitions illustrated in FIG. 3, the power consumption indicated by the area of a lattice trapezoid from the timing (1) to the timing (3) and the power consumption indicated by the area of a lattice trapezoid from the timing (3) to the timing (4)). The third power consumption implies the power consumption in the normal power consumption state (S3) (in the transitions illustrated in FIG. 3, the power consumption indicated by the area of a slanted lattice trapezoid from the timing (4) to the timing (6). Thus, the third power consumption also implies the power consumption occurring in some a different power consumption state (for example, the normal power consumption state (S3)). Meanwhile, based on the cumulative time of the second power consumption state, the display content control unit 237-3 calculates the power consumption for each of one or more network protocols. Moreover, from the total of the power consumption calculated corresponding to each of one or more network protocols, the display content control unit 237-3 calculates the daily power consumption. Furthermore, when the communication control module 232 determines that disabling is possible, the display content control unit 237-3 resets the power consumption calculated corresponding to each transfer factor. A transfer factor includes packets for causing one or more network protocols used in the information processing device 2, to function. In the first embodiment, the display content control unit 237-3 represents an example of a calculating unit.

Moreover, the display content control unit 237-3 displays, in the operation panel 211 (an example of a display unit), a screen including the calculated power consumption of each predetermined transfer factor and including one or more checkboxes (an example of selecting parts) for disabling the transfer to the second power consumption state due to a transfer factor. More particularly, from among the calculated energy effects, regarding the network protocols expected to enable achieving the energy saving effect equal to or greater than a threshold value, the display content control unit 237-3 display a screen including the energy saving proposal (the power saving proposal) in the operation panel 211 via the UI display unit 237-4. The display content control unit 237-3 displays, in the display unit, a screen including the daily power consumption calculated for each network protocol and including the function of each of one or more network protocols that becomes unavailable as a result of disabling the transfer to the second power consumption state. Herein, the display content control unit 237-3 displays the daily power consumptions, which are included in the screen, in descending order of power consumptions (energy saving effects). Moreover, when the user uses the administrative right and logs into the information processing device 2, the display content control unit 237-3 displays a screen including the energy saving proposal (the power saving proposal) in the operation panel 211. In the first embodiment, the display content control unit 237-3 represents an example of a display control unit.

The UI display unit 237-4 displays, in the operation panel 211, a UI for implementing the energy saving proposal and a banner for displaying the UI. The UI for implementing the energy saving proposal includes the information containing the following: a component such as a checkbox for varying enable/disable of the network protocol that represents a transfer factor, that is currently enabled, and that can be disabled; a text indicating the energy saving effect attributed to the disabling of that network protocol; and a text indicating the function that becomes unavailable as a result of disabling. In the first embodiment, the UI display unit 237-4 functions as a display control unit.

Meanwhile, with respect to one or more checkboxes included in the operation panel 211, the UI display unit 237-4 receives an operation for disabling the functions that are associated to the concerned checkboxes and that are related to the transfer factor. In the first embodiment, the UI display unit 237-4 represents an example of a receiving unit. The functions for which the operation for disabling is received can be the functions implemented by the display content control unit 237-3.

In FIG. 5, the connection counts among the program modules indicate the multiplicity of the connected modules. In the main system 230, the number of communication control modules 232 ranges from zero to more than one. Moreover, a single communication control module 232 can include zero to more than one sets of automated response information. Furthermore, single communication control module 232 can be used by a plurality of applications performing communication using the same communication protocol.

Automated response information management table FIG. 7 is a conceptual diagram illustrating an example of an automated response information management table. Herein, the data table explained below is only exemplary, and is not the only possible case. In the main memory unit is built the automated response information management DB 2311 that is configured using the automated response information management table as illustrated in FIG. 7. In the automated response information management table, for each protocol ID, the following items are stored and managed in a corresponding manner: relevant protocol name, function, disabling possible/not possible, current enable/disable setting, and automated response information.

The item "protocol ID" represents identification information that enables identification of the communication protocol. The item "relevant protocol name" indicates one of the following: "Bonjour" having the printing function; "SSDP" having the device search function; "SNMP" having the state confirmation function; and "TCP/IP" having with the printing function. The item "disabling possible/not possible" is for setting whether or not to allow disabling of the corresponding protocol. The item "current enable/disable setting" indicates the enabled state or the disabled state of the concerned protocol. Meanwhile, in the item "disabling possible/not possible", if "disabling not possible" is set, then the item "current enable/disable setting" is set to "enabled" (i.e., is not set to "disabled"). The item "automated response information" is used to manage the information about whether or not the automated response is possible. For example, the item "automated response information" is managed using "automated response not possible" (indicating that a response cannot be given from the subsystem and that a response is required in the main system) and using "automated response possible" (indicating that a response can be given from the subsystem).

In the first embodiment, the automated response information management table (the automated response information management DB 2311) represents an example of an automated response information managing unit.

Factor-by-Factor Total Transfer Time Management Table

FIG. 8 is a conceptual diagram illustrating an example of a factor-by-factor total transfer time management table. Herein, the data table explained below is only exemplary, and is not the only possible case. In the main memory unit is built the factor-by-factor total transfer time management DB 2312 that is configured using the factor-by-factor total transfer time management table as illustrated in FIG. 8. In the factor-by-factor total transfer time management table, for each protocol ID, the following items are stored and managed in a corresponding manner: function, controller state start date-time, controller state end date-time, and controller state cumulative duration.

The item "controller state start date-time" represents the date and time of transfer from the power saving state (S1) to the controller state (S2). The item "controller state end date-time" represents the date and time of transfer from the controller state (S2) to the power saving state (S1) or the normal power consumption state (S3). The item "controller state cumulative duration" represents the period of time for which the controller state (S2) went on, and represents the information obtained by subtracting the controller state start date-time from the controller state end date-time. In the first embodiment, the controller state cumulative duration is equal to about 30 (s).

In the first embodiment, the factor-by-factor total transfer time management table (the factor-by-factor total transfer time management DB 2312) represents an example of a factor-by-factor total transfer time managing unit.

Functional Configuration of Subsystem

Returning to the explanation with reference to FIG. 5, the subsystem 240 includes various function modules or program modules such as a main system communication module 241, an automated response condition determination module 242, and an automated response module 243.

The function modules or the program modules are recorded in the ROM 2402 and are loaded in the RAM 2403. Each program module loaded in the RAM 2403 causes the sub CPU 2401 to execute the corresponding processing sequence, so that the corresponding function gets implemented. Meanwhile, the subsystem 240 includes a sub memory unit built using at least either the ROM 2402 illustrated in FIG. 4.

The main system communication module 241 receives information from the main system 230 and sends requests to the main system 230. Examples of the information received from the main system 230 include the substitute communication-control information. Examples of a request to the main system 230 include a transfer request targeted at the main system 230. The main system communication module 241 sends, to a management server 3, the power consumption corresponding to each transfer factor as calculated by the display content control unit 237-3.

The automated response condition determination module 242 performs packet analysis for identifying the types of the packets based on the automated response information included in the substitute communication-control information set in the main system 230. After performing the packet analysis, the automated response condition determination module 242 determines whether to give an automated response with respect to the received packets; or, even if the main system should be made to give a response, determines whether to ignore about giving the response because the concerned function is currently disabled; or determines whether to make the main system give a response. However, if none of the determination criteria mentioned above is not matching, the automated response condition determination module 242 can ignore the concerned packets. Meanwhile, the automated response condition determination module 242 represents an example of a memory reading unit that stores various setting values in a substitute communication-control information management DB 2411 (explained later) and reads the stored setting values.

When the automated response condition determination module 242 determines that an automated response should be given, the automated response module 243 given an automated response with respect to the received packet based on the automated response information. Meanwhile, the automated response module 243 represents an example of a receiving unit that receives various packets via the network I/F 2406 illustrated in FIG. 4.

The substitute communication-control information is used by the subsystem 240 for controlling automated response and determining the need for restoring the main system 230. Regarding the substitute communication-control information management DB 2411 used for managing the information associated to the substitute communication-control information, the explanation is given later.

Substitute Communication-Control Information Management Table

FIG. 9 is a conceptual diagram illustrating an example of a substitute communication-control information management table. Herein, the data table explained below is only exemplary, and is not the only possible case. In the sub memory unit is built the substitute communication-control information management DB 2411 that is configured using the substitute communication-control information management table as illustrated in FIG. 9. In substitute communication-control information management table, for each protocol ID, the following items are stored and managed in a corresponding manner: relevant protocol name, function, current enable/disable setting, and automated response information.

The item "automated response information" is used to manage about whether to give an automated response of a packet that is related to the corresponding protocol name or to perform some other operation. The item "automated response information" indicates, for example, "ignore", "restore main system", and "automated response". The automated response information represents an example of the substitute communication-control information, and contains the MAC address and the IP address assigned to the information processing device 2.

In the first embodiment, the substitute communication-control information management table (the substitute communication-control information management DB 2411) represents an example of a substitute communication-control information managing unit.

Processing or Operations According to Embodiment

Explained below with reference to FIGS. 10 to 17 is a variety of processing operations performed in the information processing system. The sequence diagrams referred to in the following explanation are only exemplary diagrams for describing the first embodiment, and are not the only possible sequence diagrams.

Data Registration Operation

Figure 10:
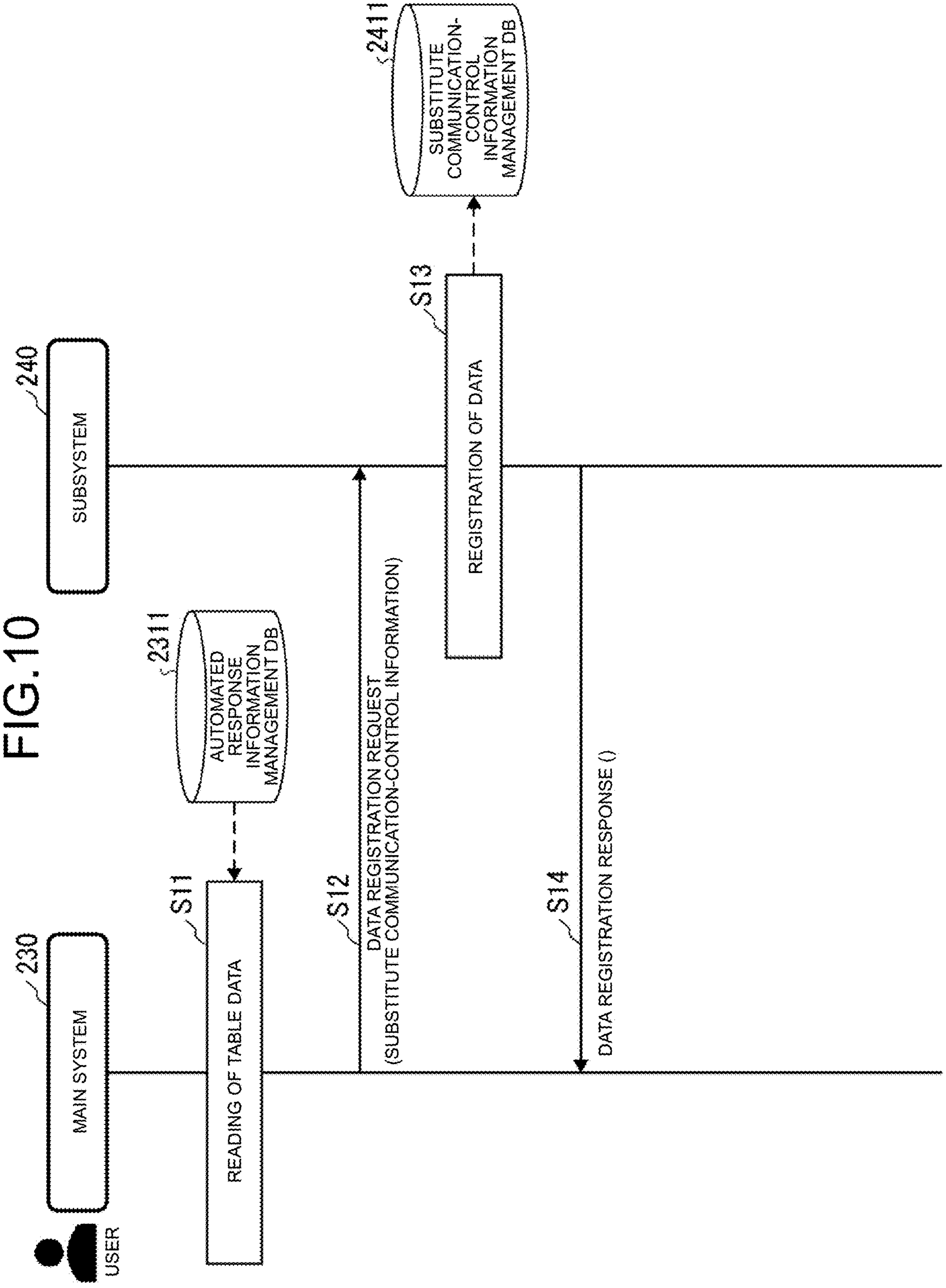
FIG. 10 is a sequence diagram illustrating an example of a data registration operation performed in the information processing device.

FIG. 10 is a sequence diagram illustrating an example of a data registration operation performed in the information processing device. The sequence diagram illustrated in FIG. 10 is only exemplary, and is not the only possible case. As illustrated in FIG. 10, firstly, the communication control module 232 of the main system 230 reads a data table (Step S11). More particularly, the communication control module 232 reads all of the items being managed in the automated response information management DB 2311 (see FIG. 7).

Then, the communication control module 232 as well as the subsystem setting module 233 sends a data registration request, which includes the substitute communication-control information, to the subsystem 240 via the subsystem I/F module 236 (Step S12).

Subsequently, in the subsystem 240, the automated response condition determination module 242 registers data (Step S13). More particularly, the automated response condition determination module 242 registers (stores) the substitute communication-control information, which is received at Step S12, in the items associated to the protocol ID managed in the substitute communication-control information management DB 2411.

Then, the main system communication module 241 sends, as a response to the data registration request issued at Step S12, a data registration response to the main system 230 (Step S14). The data registration response can include the information indicating that data registration is completed. Meanwhile, it is also possible to omit the operation at Step S14.

Figure 11:
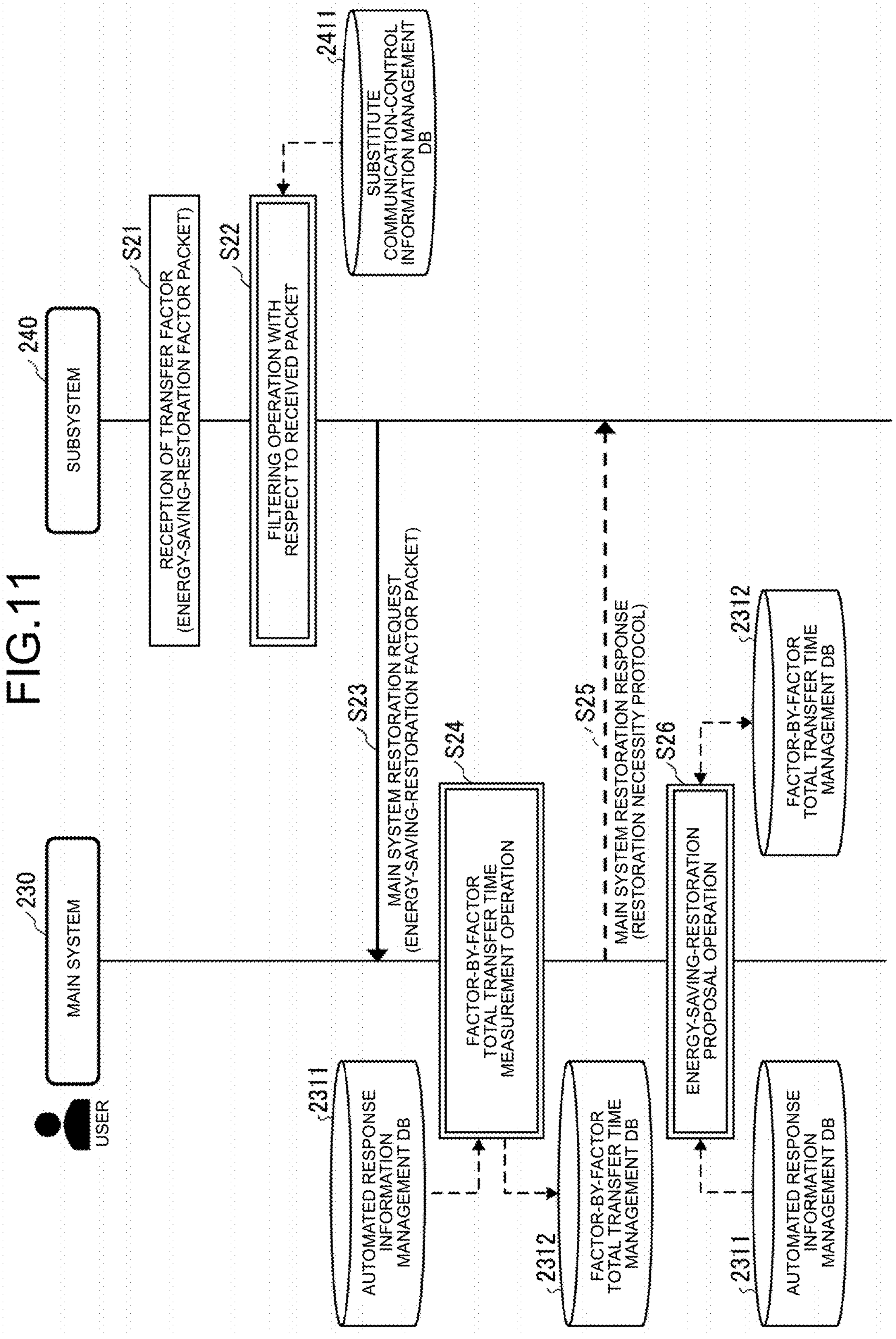
FIG. 11 is a sequence diagram illustrating an example of processing including a filtering operation, a factor-by-factor total transfer time measurement operation, and an energy-saving transfer proposal operation performed with respect to a received packet in the information processing device.

Processing with Respect to Received Packet and Variety of Processing Related to Transfer from Energy Saving Given below is the explanation of the processing performed with respect to a received packet and a variety of processing related to the transfer from energy saving. FIG. 11 is a sequence diagram illustrating an example of processing including a filtering operation, a factor-by-factor total transfer time measurement operation, and an energy-saving-restoration proposal operation performed with respect to a received packet in the information processing device. The sequence diagram illustrated in FIG. 11 is only exemplary, and is not the only possible case. As illustrated in FIG. 11, firstly, in the subsystem 240, the automated response condition determination module 242 receives the transfer factor (an energy-saving-restoration factor packet) (Step S21). More particularly, for example, the automated response condition determination module 242 receives, via the network I/F 2406, a predetermined packet (frame) that enables restoration of the information processing device 2 from the power saving state (S1) (i.e., transfer of the information processing device 2 to the controller state (S2) or the normal power consumption state (S3)).

Subsequently, the automated response condition determination module 242 performs a filtering operation with respect to the received packet (Step S22). More particularly, the automated response condition determination module 242 searches the substitute communication-control information management DB 2411 (see FIG. 9) using the protocol ID, which is specified in the received packet, as the search key and reads the relevant protocol name, the function, the current enable/disable setting, and the automated response information.

Details of Filtering Operation with Respect to Received Packet

Figure 12:
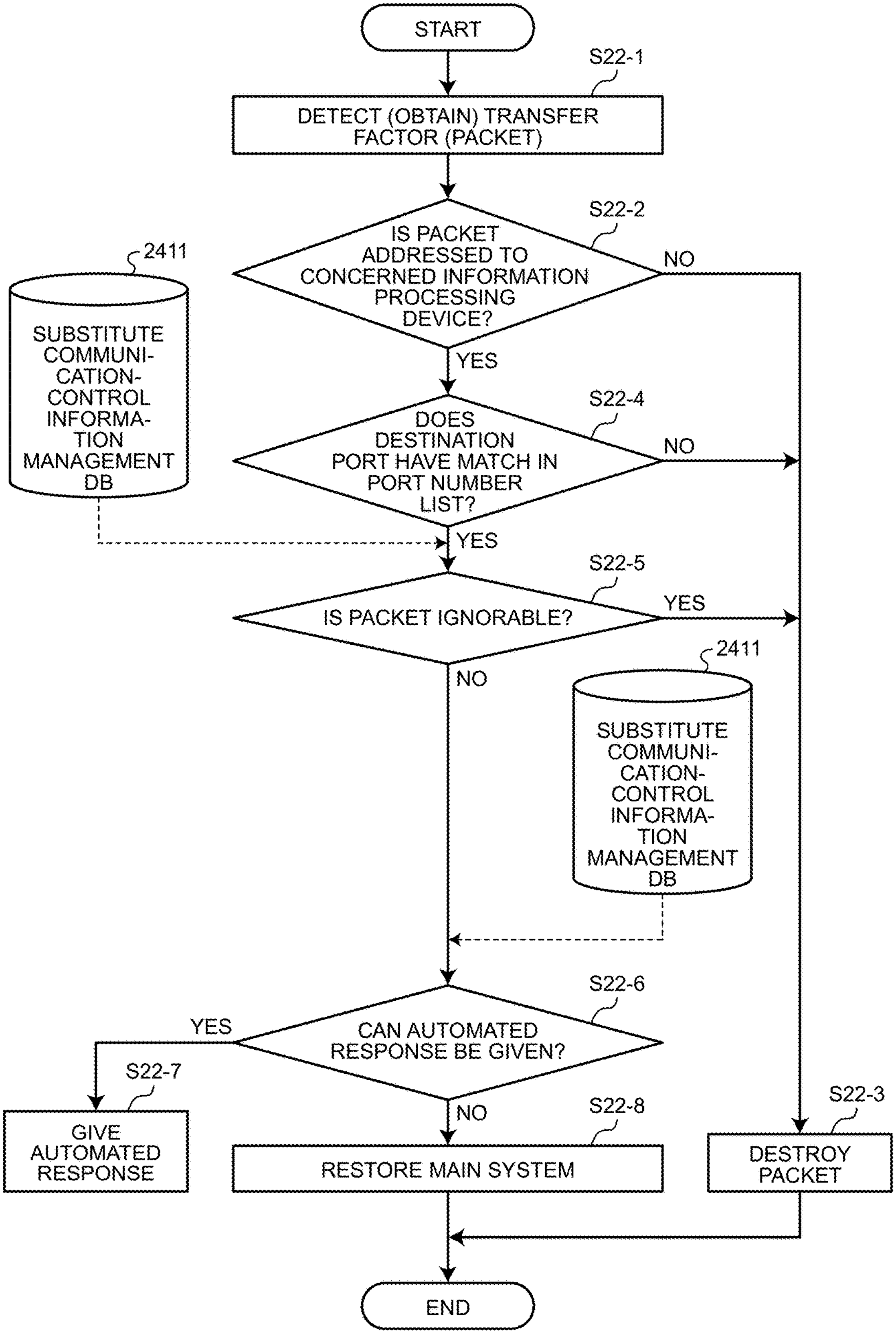
FIG. 12 is a flowchart for explaining an example of the filtering operation performed with respect to a received packet.

Given below is the detailed explanation about the filtering operation performed with respect to a received packet. FIG. 12 is a flowchart for explaining an example of the filtering operation performed with respect to a received packet. As explained above, upon receiving a packet (frame), the automated response condition determination module 242 detects (obtains) the transfer factor (an energy-saving-restoration factor packet) (Step S22-1). More particularly, based on the substitute communication-control information (automated response information), the automated response condition determination module 242 detects the transfer factor according to a network packet.

Then, the automated response condition determination module 242 determines whether or not the received packet is addressed to the information processing device 2 (Step S22-2). More particularly, the automated response condition determination module 242 determines whether or not the destination MAC address and the destination IP address of the received packet is identical to the MAC address and the IP address included in the automated response information (the substitute communication-control information).

If the received packet is not addressed to the information processing device 2, that is, if the destination MAC address and the destination IP address in the received packet is not identical to the MAC address and the IP address specified in the automated response information (the substituted communication-control information) (NO at Step S22-3), then the automated response condition determination module 242 determines that the received packet is not addressed to the image formation device 10 and destroys the received packet (Step S22-3), and exits the flow.

On the other hand, if the received packet is a broadcast packet, then the automated response condition determination module 242 determines that the received packet is addressed to the information processing device 2. Moreover, if the received packet is a multicast packet; then, as long as the information processing device 2 belongs to that multicast group, the automated response condition determination module 242 determines that the received packet is addressed to the information processing device 2.

When it is determined that the received packet is addressed to the information processing device 2 (YES at Step S22-2), the automated response condition determination module 242 determines whether or not the destination port has a match in the port number list (Step S22-4). More particularly, the automated response condition determination module 242 determines whether the destination port address of the received packet matches with any port number listed in the port number list of the substitute communication-control information.

If the destination port number of the received packet does not match with any port number listed in the port number list (NO at Step S22-4), then the automated response condition determination module 242 destroys the received packet (Step S22-3) and exits the flow.

When the received packet matches with any one port number listed in the port number list (YES at Step S22-4), then the automated response condition determination module 242 further determines whether the received packet is ignorable (Step S22-5). More particularly, the automated response condition determination module 242 searches the substitute communication-control information management DB 2411 (see FIG. 9) using the protocol ID, which is associated to the received packet, as the search key; reads the corresponding automated response information; and determines whether or not the received packet is ignorable.

If it is determined that the received packet is ignorable (YES at Step S22-5), then the automated response condition determination module 242 destroys the received packet (Step S22-3) and exits the flow.

On the other hand, if it is determined that the received packet is not ignorable (NO at Step S22-5), then the automated response condition determination module 242 further determines whether an automated response can be given (Step S22-6). More particularly, the automated response condition determination module 242 searches the substitute communication-control information management DB 2411 (see FIG. 9) using the protocol ID, which is associated to the received packet, as the search key; reads the corresponding automated response information; and determines whether or not an automated response can be given.

When it is determined that an automated response can be given (YES at Step S22-6), then the automated response condition determination module 242 gives an automated response using the automated response module 243 (Step S22-7).

On the other hand, if it is determined that an automated response cannot be given (or that the main system 230 should be restored) (NO at Step S22-6), then the automated response condition determination module 242 performs the operation for restoring the main system 230 (Step S22-8) and exits the flow.

Returning to the explanation with reference to FIG. 11, in the case of restoring the main system 230 (Step S22-8) as explained with reference to FIG. 12, the main system communication module 241 sends a transfer request to the main system 230 (Step S23). As a result, in the main system 230, the subsystem I/F module 236 receives a main system restoration request issued by the subsystem 240. The main system restoration request includes an energy-saving-restoration factor packet. At that time, the main system 230 is in the power saving state (S1) and is waiting for the detection of the transfer factor according to a network packet and is waiting for the detection of the user operation factor such as an operation of the operation panel or the printing function. Herein, the energy-saving-restoration packet represents an example of a predetermined transfer factor.

Subsequently, the main system 230 performs the factor-by-factor total transfer time measurement operation (Step S24).

Details of Factor-by-Factor Total Transfer Time Measurement Operation

Figure 13:
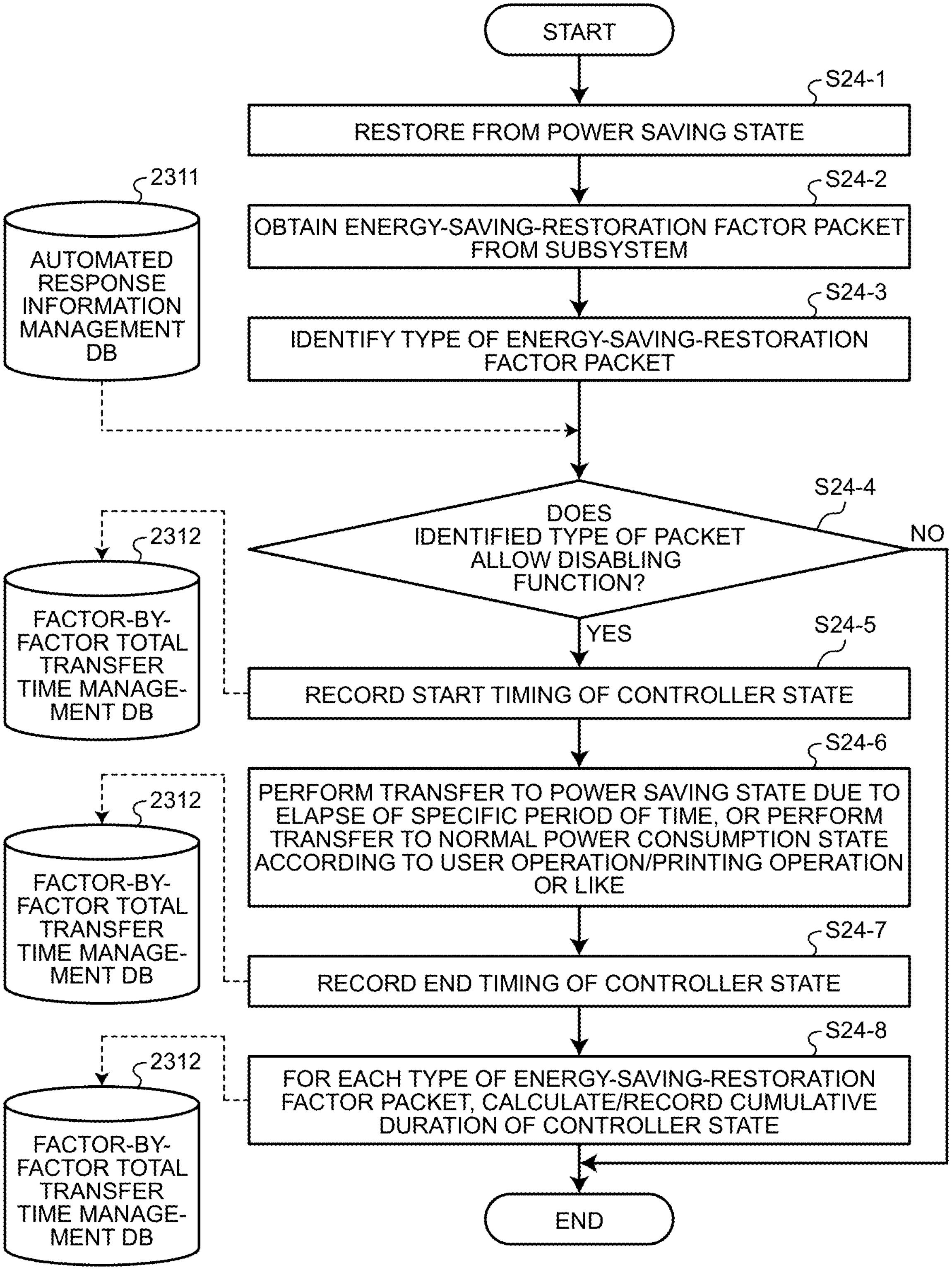
FIG. 13 is a flowchart explaining an example of the factor-by-factor total transfer time measurement operation.

Given below is the detailed explanation of the factor-by-factor total transfer time measurement operation. FIG. 13 is a flowchart explaining an example of the factor-by-factor total transfer time measurement operation. Firstly, the main system 230 gets restored from the power saving state (Step S24-1). More particularly, in the main system 230, the state management module 234 restores the main system 230 according to a main system restoration request received at Step S23. As a result, the information processing device 2, transfers from the power saving state (S1) to the normal power consumption state (S3).

Then, the subsystem I/F module 236 obtains the energy-saving-restoration packet from the subsystem (Step S24-2). More particularly, the subsystem I/F module 236 receives the energy-saving-restoration factor packet included in the main system restoration request issued by the subsystem 240.

Then, each communication control module 232 corresponding to one of the protocols associated to the received packet identifies the type of the energy-saving-restoration factor packet (Step S24-3).

Subsequently, the communication control module 232 determines whether or not the concerned type of packet allows disabling the function (Step S24-4). In other words, the communication control module 232 determines whether it is possible to disable the function for the type of the packet representing the transfer factor. More particularly, the communication control module 232 searches the automated response information management DB 2311 using the protocol ID, which is associated to the packet ID specified in the identified energy-saving-restoration factor packet, as the search key and determines whether or not it is possible to disable the corresponding function.

For example, if printing (Bonjour (mDNS)) represents the associated protocol name, then the item "disabling possible/not possible" is set to "disabling possible". Hence, the communication control module 232 that manages the printing (Bonjour (mDNS)) packets determines that disabling is possible. On the other hand, if TCP/IP (print: Standard TCP/IP) represents the associated protocol name, then the item "disabling possible/not possible" is set to "disabling not possible". Hence, the communication control module 232 that manages the TCP/IP (print: Standard TCP/IP) packets determines that disabling is not possible.

When it is determined that disabling is not possible (NO at Step S24-4), the main system 230 ends the factor-by-factor total transfer time measurement operation and exits the flow.

On the other hand, when it is determined that disabling is possible (YES at Step S24-4), the communication control module 232 that processes the energy-saving-restoration factor packets records the start date-time of the controller state (S2) (Step S24-5). More particularly, at the start date-time of the controller state of the functions associated to the protocol IDs being managed in the factor-by-factor total transfer time management DB 2312 (see FIG. 8), the communication control module 232 that processes the energy-saving-restoration factor packets records the date and time of starting the transfer to the controller state (S2).

Then, the state management module 234 performs transfer to the power saving state due to the elapse of a specific period of time or performs transfer to the normal power consumption state according to a user operation/a printing operation (Step S24-6). More particularly, the state management module 234 performs transfer to the power saving state (S1) due to the elapse of a specific period of time or performs transfer to the normal power consumption state (S3) according to a user operation/a printing operation.

Subsequently, the communication control module 232 that processes the energy-saving-restoration factor packets records the end date-time of the controller state (S2) (Step S24-7). More particularly, at the end date-time of the controller state of the functions associated to the protocol IDs being managed in the factor-by-factor total transfer time management DB 2312 (see FIG. 8), the communication control module 232 that processes the energy-saving-restoration factor packets records the date and time of transfer from the controller state (S2) to a different power consumption state.

Then, for each type of the energy-saving-restoration factor packet, the communication control module 232 that processes the energy-saving-restoration factor packets calculates/records the cumulating duration of the controller state (Step S24-8). More particularly, from the date and time obtained at Step S24-5 as well as at Step S24-7, the communication control module 232 that processes the energy-saving-restoration factor packets calculates the factor-by-factor transfer time (the cumulative duration). Subsequently, the communication control module 232 that processes the energy-saving-restoration factor packets records the calculated period of time (duration) in the item "controller state cumulative duration" of the functions associated to the protocol IDs being managed in the factor-by-factor total transfer time management DB 2312 (see FIG. 8). As a result, for each received packet, the communication control module 232 can obtain the total period of time (total of the cumulative durations) of restoring from the power saving state (S1) and maintaining the controller state (S2) according to that received packet (for example, the Bonjour packet received in the past one weak).

Returning to the explanation with reference to FIG. 11, the state management module 234 issues a main system restoration request to the subsystem 240 (Step S25). More particularly, the state management module 234 sends, as a response to the main system restoration request received at Step S23, a main system restoration response to the subsystem 240 via the subsystem I/F module 236. The main system restoration response can include a restoration necessity protocol.

Energy-Saving-Restoration Proposal Operation

Subsequently, in the main system 230, the energy saving proposal module 237 performs the energy-saving-restoration proposal operation. More particularly, the function modules including the factor-by-factor transfer time obtaining unit 237-1 of the energy saving proposal module 237 perform the following operation using the automated response information management DB 2311 (see FIG. 7) and the factor-by-factor total transfer time management DB 2312 (see FIG. 8).

Details of Energy-Saving-Restoration Proposal Operation

Figure 14:
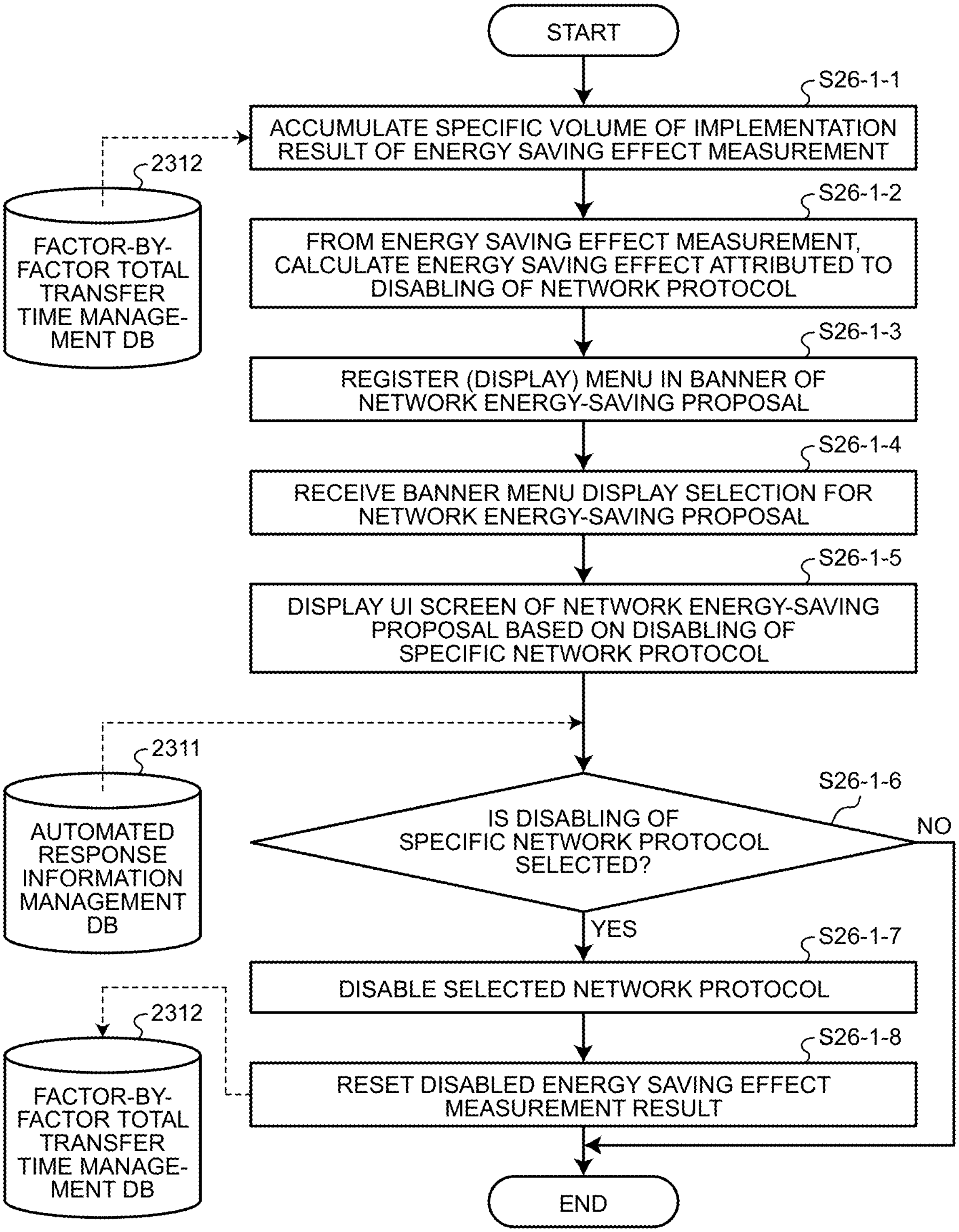
FIG. 14 is a flowchart for explaining an example of the energy-saving transfer proposal operation.

Given below is the detailed explanation of the energy-saving-restoration proposal operation. FIG. 14 is a flowchart for explaining an example of the energy-saving-restoration proposal operation. Firstly, the factor-by-factor transfer time obtaining unit 237-1 of the energy saving proposal module 237 accumulates a specific volume of the implementation result of energy saving effect measurement (Step S26-1-1). More particularly, the factor-by-factor transfer time obtaining unit 237-1 obtains the "factor-by-factor total transfer time" via the communication control module 232. At that time, for each protocol ID, the factor-by-factor transfer time obtaining unit 237-1 refers to the factor-by-factor total transfer time management DB 2312 (see FIG. 8), adds all corresponding controller state cumulative durations, and obtains the "factor-by-factor total transfer time" for the concerned protocol ID. Then, the display content control unit 237-3 of the energy saving proposal module 237 confirms the elapse of a predetermined period of time since the energy saving effect measurement (for example, the display content control unit 237-3 confirms the accumulation of the "factor-by-factor total transfer time" of the past three weeks.

Then, from the energy saving effect measurement, the display content control unit 237-3 calculates the energy saving effect attributed to the disabling of the network protocol (Step S26-1-2). More particularly, from the "factor-by-factor total transfer time/predetermined period of time", the display content control unit 237-3 calculates the average power consumption within the predetermined period of time, and calculates the energy saving effect attributed to the disabling of the concerned network protocol. Thus, that operation corresponds to the operation in which, based on the packet information representing the transfer factor, after the transfer from the power saving state (S1) to the controller state (S2), the power consumption till transfer to a different power consumption state including the power saving state (S1) is calculated corresponding to each transfer factor.

Subsequently, the display content control unit 237-3 registers (displays) a menu in the banner of the network energy-saving proposal (Step S26-1-3). More particularly, the display content control unit 237-3 registers the menu of the banner of the network energy-saving proposal and informs the user about the existence of an energy saving proposal.

Then, the display content control unit 237-3 receives a banner menu display selection for the network energy-saving proposal (Step S26-1-4). More particularly, the display content control unit 237-3 receives the user selection of the banner menu display of the network energy-saving proposal as displayed in the operation panel.

Subsequently, the display content control unit 237-3 displays a UI screen of the network energy-saving proposal based on the disabling of a specific network protocol (Step S26-1-5). More particularly, using the UI display unit 237-4, the display content control unit 237-3 displays, in the operation panel 211, a screen including energy saving effect calculated at Step S26-1-2 and including the network energy-saving proposal (message) indicating the unavailable functions. That operation corresponds to the operation in which a network energy-saving proposal screen 2111, which includes the calculated power consumption for each transfer factor and includes one or more checkboxes for disabling the transfer to the controller state (S2) due to the transfer factor, is displayed in the operation panel 211.

Example of Screen Display

Figure 15:
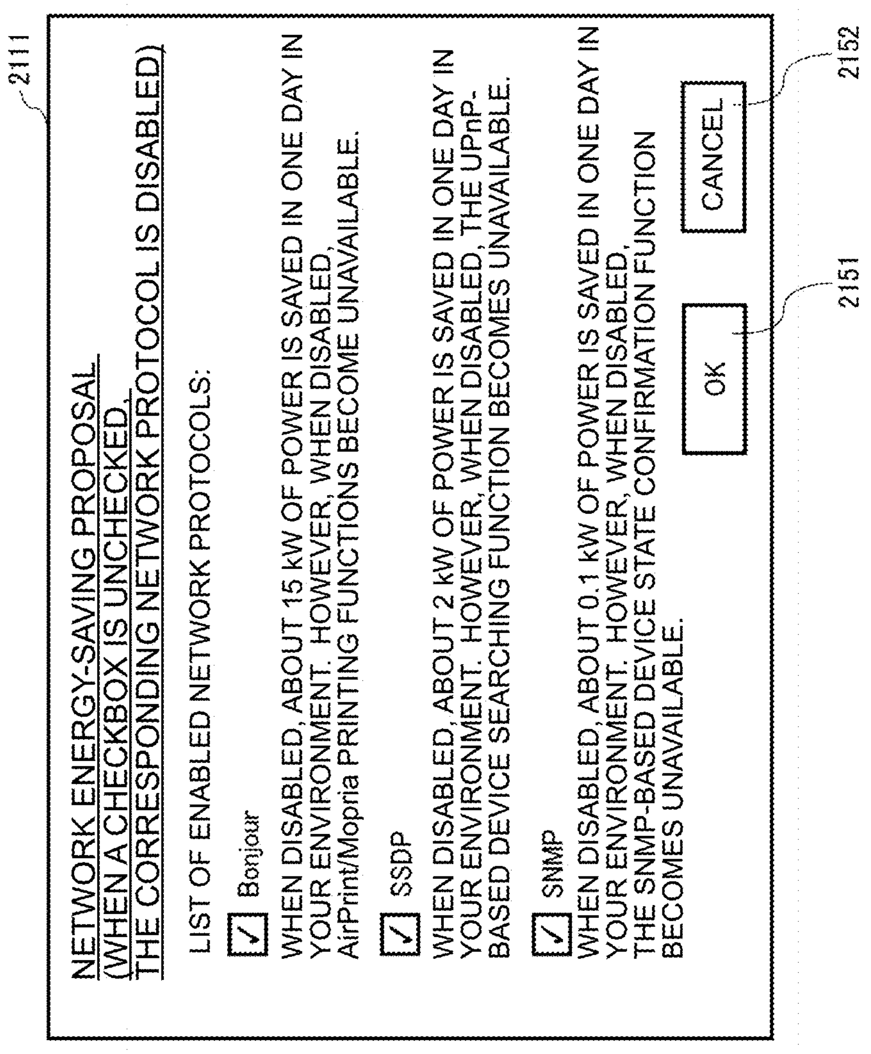
FIG. 15 is a diagram illustrating an example of a network energy-saving proposal screen in the information processing device.

FIG. 15 is a diagram illustrating an example of a network energy-saving proposal screen in the information processing device. As illustrated in FIG. 15, in the operation panel 211 of the information processing device 2, a network energy-saving proposal screen 2111 is displayed by the UI display unit 237-4 of the energy saving proposal module 237. In the network energy-saving proposal screen 2111, an enabled-network-protocol list, an OK button 2151, and a cancel button 2152 are displayed as the content for encouraging implementation of the network energy-saving proposal.

The enabled-network-protocol list indicates the content regarding which the functions are current enabled and disabling those functions is expected to result in achieving the energy saving effect. More particularly, the following is displayed for each protocol:

- protocol names and check boxes (representing examples of a selecting part. When a checkbox is unchecked, the corresponding functions gets disabled)
- electric power enabling power saving per day when the functions are disabled (i.e., energy saving effect)
- comment indicating unavailability of the disabled functions corresponding to the concerned protocol As a result, in order to disable the functions, the checkbox displayed next to the function to be disabled can be unchecked and if the OK button 2151 can be pressed. Meanwhile, if the cancel button 2152 is operated, various operations including checking of the checkboxes get cancelled. Given below are the examples of the functions that can be disabled.

1. Bonjour

The Bonjour function is one of the implementations of mDNS (multicast DNS), is used for searching devices such as printers/scanners/FAX machines in the protocol which is used in macOS and in which name resolution is possible in the same segment. When the Bonjour function is disabled, device searching cannot be performed using, for example, the AirPrint technique (representing the technique for searching devices including information communication terminals, such as smartphones, tablets, and notebook PCs, and printers).

2. SSDP

Herein, SSDP stands for Simple Service Discovery Protocol that represents the communication protocol used in UPnP (Universal Plug and Play) in which the devices in a network are automatically found and connected. When the SSDP function is disabled, device searching cannot be performed using SSDP (UPnP).

3. SNMP

Herein, SNMP stands for Simple network Management Protocol that represents a management protocol for monitoring/controlling the TCP/IP network environment. When the SNMP function is disabled, information about the state of a device, such as online/offline or printing, cannot be obtained from other devices.

In the network energy-saving proposal screen 2111, the automated response is compatible with some of the SNMP requests. However, it is possible to think of a situation in which the functions compatible to the SNMP get restored from the power saving state (S1) to the controller state (S2), when an SNMP request not compatible to the automated response is received in the subsystem 240, due to the version upgrade of the OS of the PC due to the elapse in time. In that regard, if the first embodiment is implemented in such a case, then it becomes possible to neutralize the situation in which the controller state (S2) gets restored due to disabling of the concerned functions.

Meanwhile, in the first embodiment, the UI display unit 237-4 can be configured to display the functions in descending order of the energy saving effects as illustrated in the network energy-saving proposal screen 2111.

In this way, the information processing device 2 display a screen that includes information indicating the enhancement in the energy saving effect corresponding to the disabling of each function, and prompts the user to select disabling of the functions. As a result, it can be expected to achieve promotion in the energy saving effect.

Returning to the explanation with reference to FIG. 14, the communication protocol setting varying unit 237-2 determines whether the disabling of a specific network protocol is selected (Step S26-1-6). More particularly, the communication protocol setting varying unit 237-2 determines whether the user has selected the disabling of a specific protocol in the UI screen displayed by the UI display unit 237-4. At that time, the communication protocol setting varying unit 237-2 searches the automated response information management DB 2311 (see FIG. 7) using the protocol ID as the key and reads the current enable/disable setting corresponding to that protocol ID.

If the disabling of a specific network protocol has not been selected (NO at Step S26-1-6), then the main system 230 ends the energy-saving-restoration proposal operation and exits the flow.

On the other hand, if the disabling of a specific network protocol is selected (YES at Step S26-1-6), then the communication protocol setting varying unit 237-2 disables the selected network protocol (Step S26-1-7). That is, the communication protocol setting varying unit 237-2 disables the network protocol selected by the user.

Then, the factor-by-factor transfer time obtaining unit 237-1 resets energy saving effect measurement result that was disabled (Step S26-1-8) and exits the flow. More particularly, the factor-by-factor transfer time obtaining unit 237-1 resets, as the energy saving effect measurement result that was disabled using the communication control module, the power consumption for each transfer factor as calculated based on the result associated to each protocol ID managed in the factor-by-factor total transfer time management DB 2312 (see FIG. 8); and exits the flow. At that time, the result associated to each protocol ID includes the items "controller state start date-time", "controller state end date-time", and "controller state cumulative duration". However, the factor-by-factor transfer time obtaining unit 237-1 need not reset the power consumption calculated corresponding to each transfer factor.

Other Details of Energy-Saving-Restoration Proposal Operation

Figure 16:
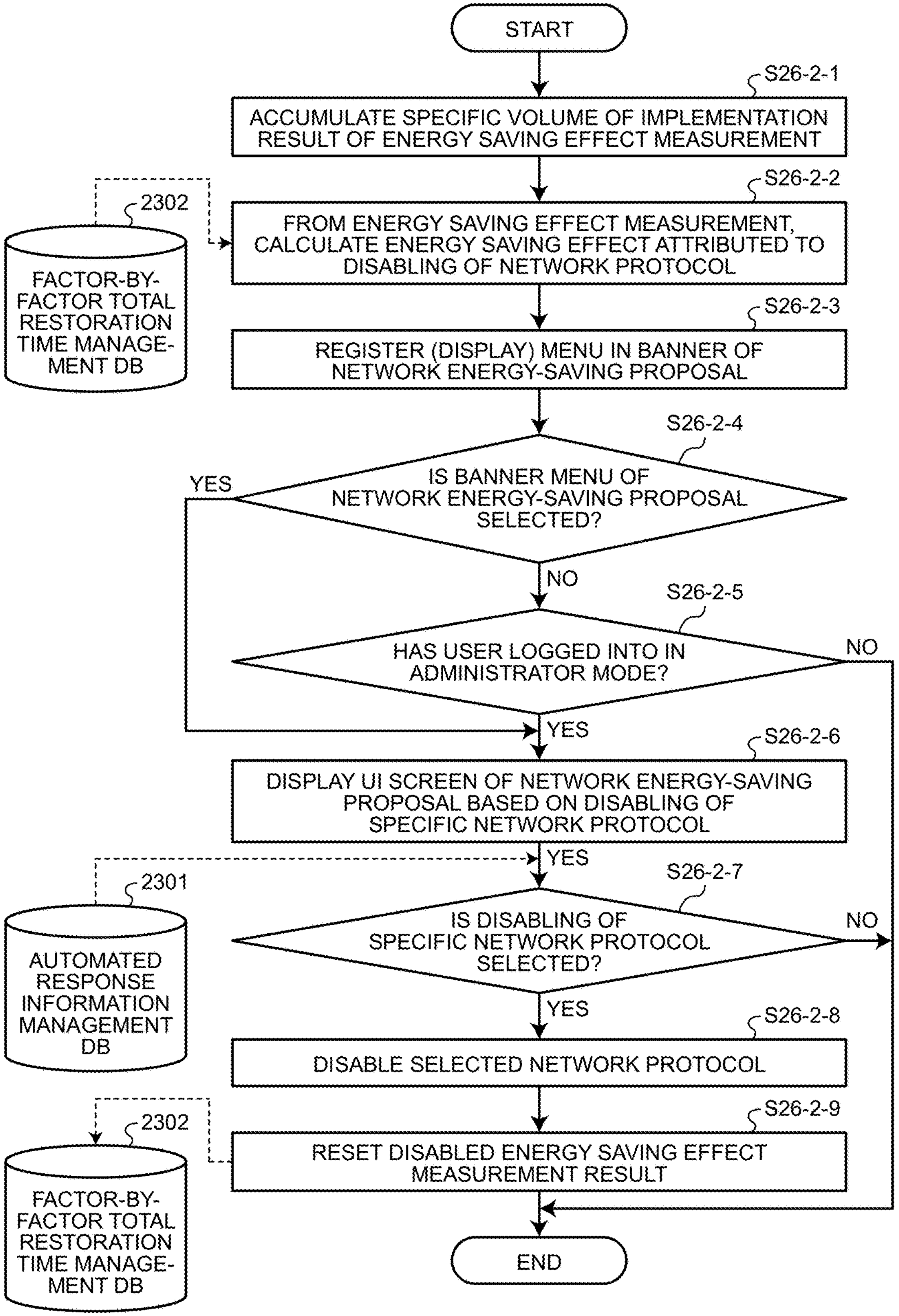
FIG. 16 is a flowchart for explaining another example of the energy-saving transfer proposal operation.

Given below is the explanation about the other details of the energy-saving-restoration proposal operation. FIG. 16 is a flowchart for explaining another example of the energy-saving-restoration proposal operation. Herein, the operations performed from Step S26-2-1 to Step S26-2-3 illustrated in FIG. 16 are identical to the operations performed from Step S26-1-1 to Step S26-1-3 as explained earlier. Hence, that explanation is not given again.

After the operation at Step S26-2-4, the communication protocol setting varying unit 237-2 determines whether the banner menu of the network energy-saving proposal is selected (Step S26-2-4). More particularly, the communication protocol setting varying unit 237-2 determines whether the banner menu of the network energy-saving proposal is selected by the user from the UI screen displayed by the UI display unit 237-4.

If it is determined that the banner menu of the network energy-saving proposal has been selected (YES at Step S26-2-4), then the system control proceeds to Step S26-2-6.

On the other hand, if it is determined that the banner menu of the network energy-saving proposal is not selected (No at Step S26-2-4), then the communication protocol setting varying unit 237-2 determines whether the user has logged into in the administrator mode (Step S26-2-5).

Example of Screen Display

Figure 17:
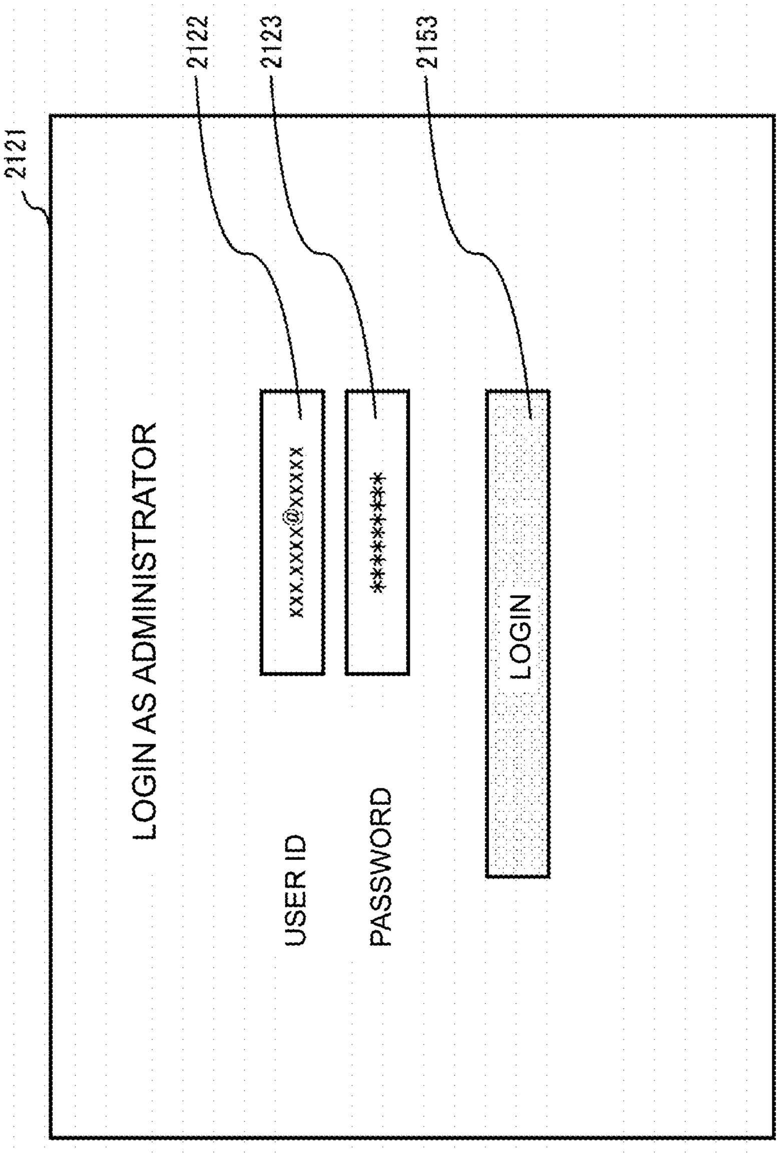
FIG. 17 is a diagram illustrating an example of a login screen in the information processing device.

FIG. 17 is a diagram illustrating an example of a login screen in the information processing device. As illustrated in FIG. 17, in the operation panel 211 of the information processing device 2, a login screen 2121 is displayed by the UI display unit 237-4 of the energy saving proposal module 237. In the login screen, the following is displayed: a display for instructing to login as an administrator; a user ID input unit 2122; a password input unit 2123; and a login button 2153. Thus, by logging into in the administrator mode from the login screen 2121, the user (administrator) can make an administrator login.

Returning to the explanation with reference to FIG. 16, the operations from Step S26-2-6 to Step S26-2-9 are performed. However, since those operation are identical to the operations performed from Step S26-1-5 to Step S26-1-8, that explanation is not given again.

Main Effects Achieved in First Embodiment

As explained above, according to the first embodiment, the information processing device 2, calculates, for each transfer factor to the controller state (S2), the power consumption since the transfer from the power saving state (S1) to the controller state (S2) until the transfer to a different power consumption state including the power saving state (S1) (Step S26-1-2); and displays, in the operation panel 211, the network energy-saving proposal screen 2111 that includes the power consumption calculated corresponding to each transfer factor and includes one or more checkboxes for disabling the transfer to the controller state (S2) according to the transfer factors (Step S26-1-5). As a result, in the case of transfer from the first power consumption state in which the power consumption is the lowest to the second power consumption state in which the power consumption is higher than in the first power consumption state, it becomes possible to disable the transfer to the second power consumption state depending on the transfer factor. Moreover, since the user of the information processing device 2 can confirm the power consumption corresponding to each transfer factor and then select to disable the transfer, it becomes possible to achieve power saving according to the usage condition of the information processing device 2 for the user.

Second Embodiment

Overall Configuration of Information Processing System

Figure 18:
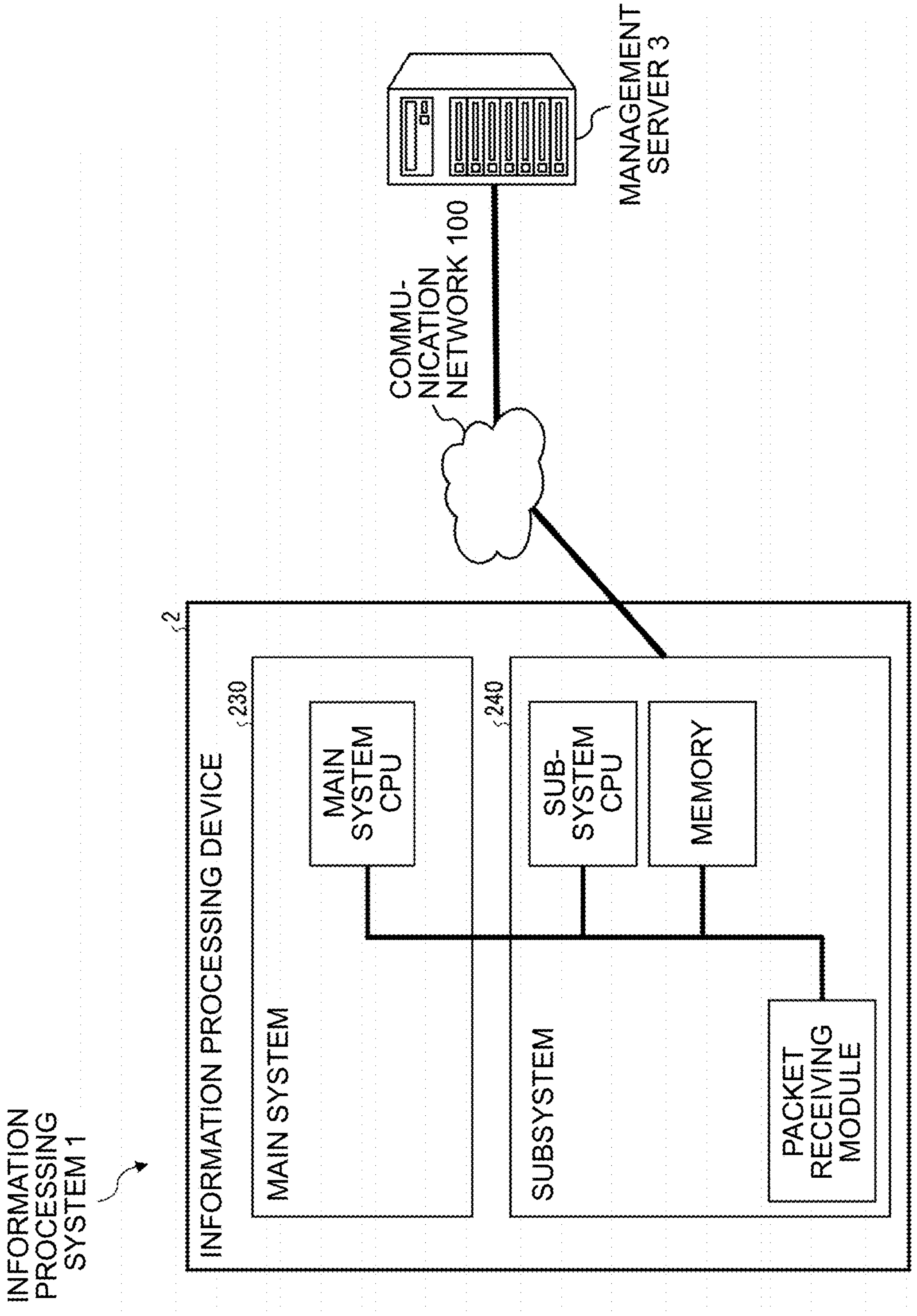
FIG. 18 is a diagram illustrating an exemplary overall configuration of an information processing system according to a second embodiment.

Given below is the description of a second embodiment. FIG. 18 is a diagram illustrating an exemplary overall configuration of an information processing system according to the second embodiment. With reference to FIG. 18, an information processing system 1 is built in which the information processing device 2 is connected to the management server 3, which can communicate with the information processing device 2 via the communication network 100. In the management server 3, a display unit (display) capable of displaying predetermined screens can also be installed. The communication network 100 is a communication network in which an unspecified amount of communication is performed, and is configured using the Internet, the intranet, or a LAN (Local Area Network). Alternatively, the communication network can also include a communication network based on wireless communication, such as 4G (4th Generation), 5G (5th Generation), WiMAX (Worldwide Interoperability for Microwave Access), or LTE (Long Term Evolution). In the second embodiment, the management server 3 represents an example of a management device.

Hardware Configuration

Figure 19:
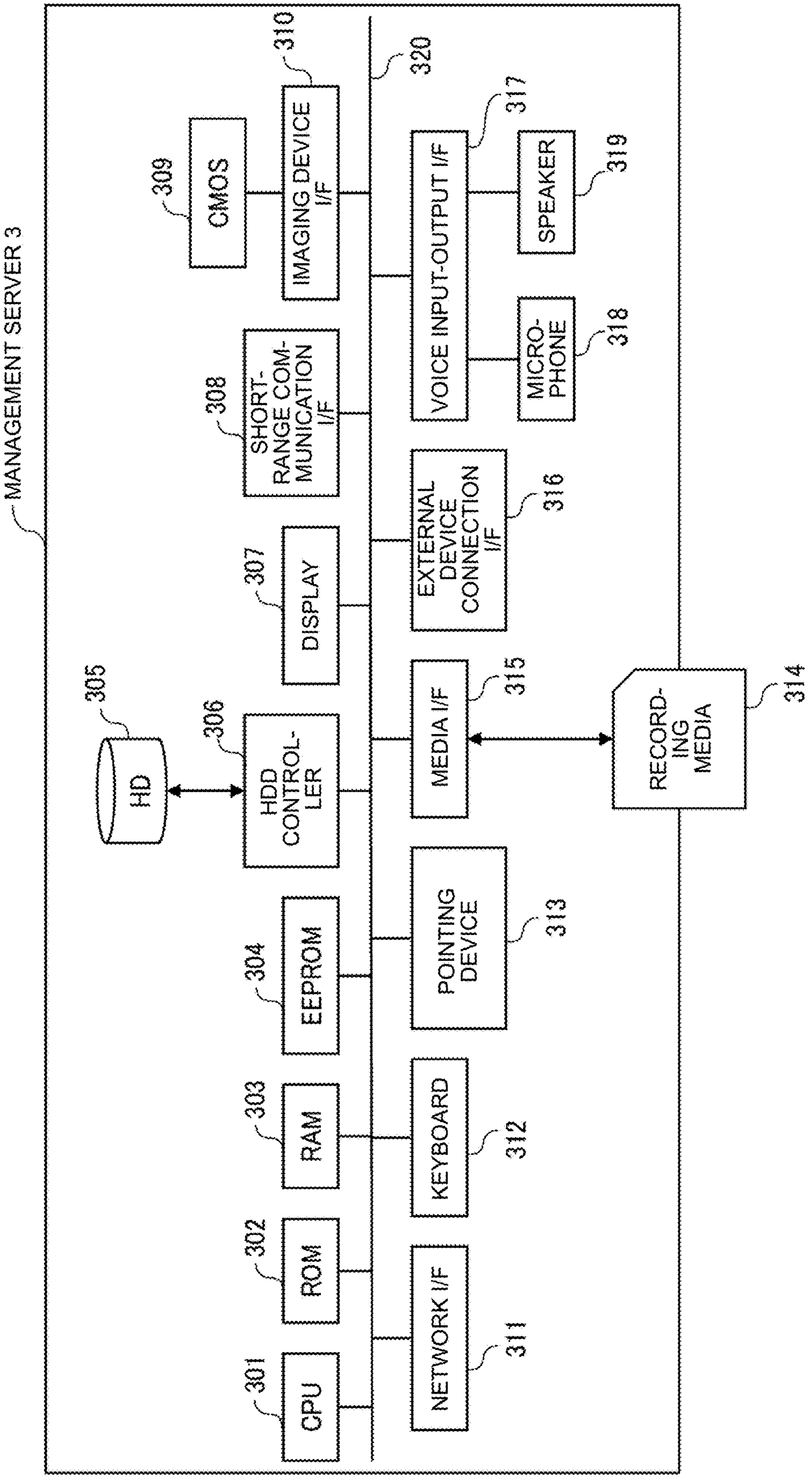
FIG. 19 is a diagram illustrating an exemplary hardware configuration of a management server.

Explained below with reference to FIG. 19 is a hardware configuration of a communication terminal or a device constituting the information processing system according to the second embodiment. In the hardware configuration of a device or a communication terminal as illustrated in FIG. 19, constituent elements can be added or deleted as may be necessary.

Hardware Configuration of Management Server

FIG. 19 is a diagram illustrating an exemplary hardware configuration of the management server. As illustrated in FIG. 19, the management server 3 is built using, for example, a computer and includes a CPU 301, a ROM 302, a RAM 303, an EEPROM 304, an HD 305, an HDD controller 306, a display 307, a short-range communication I/F 308, a CMOS sensor 309, and an imaging device I/F 310. Moreover, the management server 3 also includes a network I/F 311, a keyboard 312, a pointing device 313, a media I/F 315, an external device connection I/F 316, a voice input-output I/F 317, a microphone 318, a speaker 319, and a bus line 320.

The CP 3501 controls the operations of the entire management server 3. The ROM 302 is used store computer programs used in the driving of the CPU 301. The RAM 303 is used as the work area of the CPU 301. The EEPROM 304 is used perform reading or writing of a variety of data, such as applications, under the control of the CPU 301. The display 307 is used to display a variety of information such as a cursor, menus, windows, characters, and images. In the second embodiment, the display 307 represents an example of a display unit. The short-range communication I/F 308 is a communication circuit for performing data communication with a communication device or a communication terminal that includes a wireless communication interface such as NFC (Near Field Communication), Bluetooth, Wi-Fi (Wi-Fi is a registered trademark, which is not mentioned again hereinafter). The CMOS sensor 309 is a type of built-in imaging unit that takes images of the photographic subject under the control of the CPU 301 and obtains image data or video data. Meanwhile, instead of using a CMOS sensor, the imaging unit can be configured using a CCD (Charge Coupled Device) sensor. The imaging device I/F 310 is a circuit for controlling the driving of the CMOS sensor 309.

The network I/F 311 is an interface for performing data communication using a wired cable or a wireless communication network. The keyboard 312 is a type of input unit that includes a plurality of keys for inputting characters, numerical values, and various instructions. Meanwhile, in addition to or instead of including the keyboard 312, the management server 3 can include an input unit such as a touch-sensitive panel. The pointing device 313 is a type of input that selects and executes various instructions, selects the processing target, and moves the cursor. The media I/F 315 controls the reading or writing (storing) of the data in a recording media 314 such as a flash memory. The external device connection I/F 316 is an interface for establishing connection with various external devices. In this case, an external device is, for example, a USB (Universal Serial Bus). The voice input-output I/F 317 is a circuit that processes the input-output of voice signals between the microphone 318 and the speaker 319 under the control of the CPU 301. The microphone 318 is a built-in circuit for converting sounds into electrical signals, and obtains the voices or the sound waves generated from an external speaker, and obtains information using electrical signals. The speaker 319 is a built-in circuit that converts electrical signals into physical vibrations and generates sounds such as music or voices. The bus line 320 is an address bus or a data bus for establishing electrical connection with various constituent elements such as the CPU 301.

Functional Configuration of Information Processing System

Figure 20:
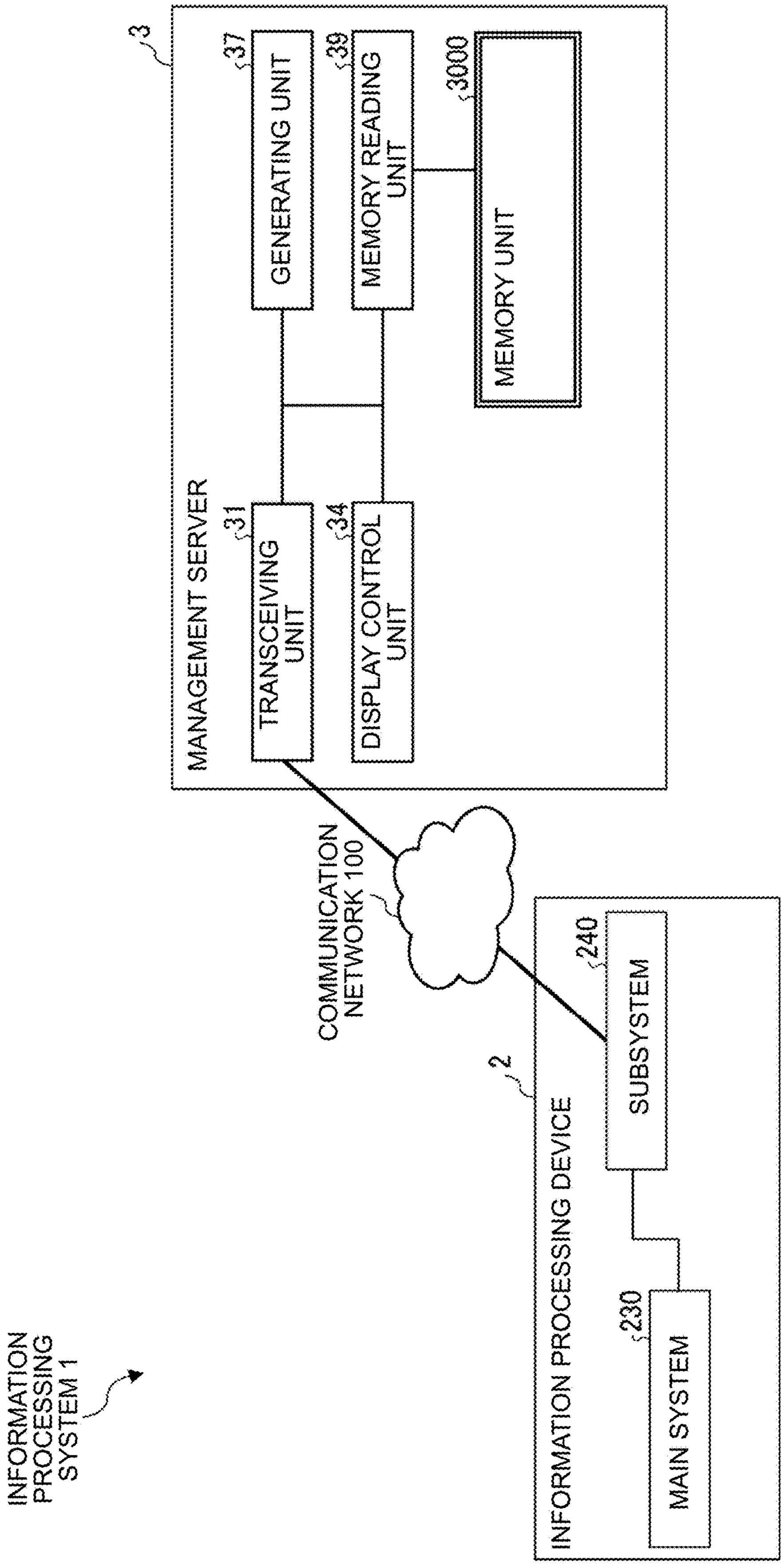
FIG. 20 is a diagram illustrating an exemplary functional configuration of the information processing system according to the second embodiment.

Explained below with reference to FIG. 20 is a functional configuration according to the second embodiment. FIG. 20 is a diagram illustrating an exemplary functional configuration of the information processing system according to the second embodiment. In FIG. 20 are illustrated those constituent elements illustrated in FIG. 18 which are involved in the processing or the operations explained below.

Functional Configuration of Information Processing Device and Various Functional Configurations The functional configuration of the information processing device 2 according to the second embodiment is identical to the details explained in the first embodiment. Hence, that explanation is not given again. Moreover, various functional configurations in the information processing device 2 are identical to the details explained in the first embodiment. Hence, that explanation is not given again.

Functional Configuration of Management Server

Given below is the explanation of a functional configuration of the management server 3. As illustrated in FIG. 20, the management server 3 includes a transceiving unit 31, a display control unit 34, a generating unit 37, and a memory reading unit 39. These function units are functions or units implemented when any hardware resource illustrated in FIG. 19 runs according to a command issued from the CPU 301 according to the computer programs for the management server 3 and loaded into the RAM 303 from at least either the HD 305 or the recording media 314. Meanwhile, the management server 3 includes a memory unit 3000 that is built using at least either the ROM 302, the EEPROM 304, the HD 305, or the recording media 314 illustrated in FIG. 19. The memory unit 3000 is used to include a communication program (a communication application) for communicating with the information processing device 2, and a browser application.

Functional Configurations in Management Server

Given below is the detailed explanation of the functional configurations in the management server 3. In the management server 3 illustrated in FIG. 20, the transceiving unit 31 is implemented as a result of the processing performed by the CPU 301 with respect to the network I/F 311 and the short-range communication I/F 308, and sends a variety of data (or information) to and receives a variety of data (or information) from the information processing device 2 via the communication network 100. The transceiving unit 31 receives power consumption information that is related to the power consumption corresponding to each predetermined transfer factor and that is sent by the information processing device 2. In the second embodiment, the transceiving unit 31 represents an example of at least either a sending unit or a receiving unit.

The display control unit 34 is mainly implemented as a result of the processing performed by the CPU with respect to the display 307 and performs display control of various screens and information (data) in the management server 3. Moreover, the display control unit 34 can be configured to, for example, use a browser and display HTML display screens in the operation panel 211 of the information processing device 2. In the second embodiment, the display control unit 34 represents an example of a display control unit.

The generating unit 37 is mainly implemented as a result of the processing performed by the CPU 301 and generates data (information) accompanying a variety of processing performed in the management server 3. The generating unit 37 generates screen information related to a screen that includes: the power consumption indicated by the power consumption information that corresponds to each transfer factor and that is received from the information processing device 2; and one or more checkboxes for disabling the transfer to the controller state (S2) due to predetermined transfer factors. In the second embodiment, the generating unit 57 represents an example of a generating unit.

The memory reading unit 39 is manly implemented as result of the processing performed by the CPU 301 with respect to at least either the ROM 302, or the EEPROM 304, or the HD 305, or the recording media 314, and stores a variety of data (or information) in the memory unit 3000 or reads a variety of data (or information) from the memory unit 3000. In the second embodiment, the memory reading unit 39 represents an example of a memory reading unit.

In this way, in the second embodiment, some of the functions of the information processing device 2 according to the first embodiment are implemented among the information processing device 2 and the management server 3 connected via the communication network 100.

Main Effects of Second Embodiment

As explained above, according to the first embodiment, the management server 3 receives the power consumption information that corresponds to each cause of transfer and that is sent by the information processing device 2; generates screen information containing the power consumption indicated by the received power consumption information corresponding to each transfer factor and containing one or more selecting parts for disabling the transfer to the controller state (S2) according to an energy-saving-restoration factor packet; and sends the generated screen information to the information processing device 2. As a result, in addition to achieving the effect according to the first embodiment, generating a UI screen in the management server 3 as an energy saving proposal enables achieving reduction in the processing load of the information processing device 2.

Modification Example of Second Embodiment

As a modification example of the second embodiment, instead of using the management server 3, a communication terminal can be built that is capable of communicating with the information processing device 2 via the communication network 100. Thus, the configuration can be such that the operations such as generating UI screen data (information), displaying the UI screen, and receiving various selection inputs that were performed in the information processing device 2 or the management server 3 can be performed in the communication terminal, and that the content (information) received by the communication terminal can be sent to the information processing device 2.

As a result, the second embodiment can be expanded to cover the communication terminals used by the users of the information processing device 2 or to cover the communication terminal used by the administrator having the administrative right. As a result, based on the disabling information selected and input in an arbitrary manner by each user or by the administrator, the power saving control involving the various functions in the information processing device 2 can be implemented in a customized manner.

Supplementary Explanation about Embodiments

The functions according to the embodiments described above can be implemented using one or more processing circuits. In the present written description, a "processing circuit" implies a device such as a processor which is implemented using an electronic circuit and in which various functions are executed according to software. Examples of such a device include a processor, an ASIC (Application Specific Integrated Circuit) designed to implement the various functions explained above, a DSP (digital signal processor), an FPGA (field programmable gate array), an SOC (System on a chip), a GPU (Graphics Processing Unit), and a conventional circuit module.

In the embodiments described above, for example, the information processing device 2 can be made to learnt the types of identified energy-saving-restoration factor packets and to learn the history of disabling setting of the functions of the identified packets according to machine learning (learning performed using artificial intelligence (AI)). As a result, the information processing device 2 can perform, according to machine learning, an operation for calculating the energy saving effect achieved by disabling the network protocols of the concerned packets. Moreover, in the embodiments described above, the power consumption is calculated since the time of transfer to the power consumption state. Alternatively, a unit for directly measuring the power consumption can be installed as a calculating unit in the information processing device 2.

Till now, the explanation was given about an information processing device, an information processing system, an information processing method, and a computer program product according to the embodiments of the present invention. However, the present invention is not limited to the embodiments described above. Thus, the appended claims are not to be limited but are to be construed as embodying all modifications and alternative constructions that may occur to one skilled in the art that fairly fall within the basic teaching herein set forth.

Summary

The aspects according to the present invention are as follows, for example.

First Aspect

As the first aspect, the information processing device 2 having at least two power consumption states (an example of an information processing device, which is not mentioned again hereinafter) includes: the display content control unit 237-3 (an example of a calculating unit, which is not mentioned again hereinafter) that, based on an energy-saving-restoration factor packet (an example of a predetermined transfer factor, which is not mentioned again hereinafter), after the transfer from the power saving state (S1) (an example of a first power consumption state, which is not mentioned again hereinafter) in which the power consumption is the lowest to the controller state (S2) (an example of a second power consumption state, which is not mentioned again hereinafter) in which the power consumption is higher than in the power saving state (S1), calculates, for each transfer factor, the power consumption till transfer to the normal power consumption state (S3) (an example of a different power consumption state, which is not mentioned again hereinafter) including the power saving state (S1); and the display content control unit 237-4 (an example of a display control unit, which is not mentioned again hereinafter) that displays, in the operation panel 211 (an example of a display unit, which is not mentioned again hereinafter), the network energy-saving proposal screen 2111 that includes the power consumption calculated corresponding to each transfer factor and includes one or more checkboxes (an example of selecting parts, which are not mentioned again hereinafter) for disabling the transfer to the controller state (S2) due to the transfer factors.

According to the first aspect, in the case of transfer from the first power consumption state, in which the power consumption is the lowest, to the second power consumption state in which the power consumption is higher than in the first power consumption state, it becomes possible to disable the transfer to the second power state depending on the transfer factor.

Second Aspect

As the second aspect, the transfer factor that is processed in the information processing device 2 includes a packet for causing one or more network protocols used in the information processing device 2, to function. At the time of transfer from the power saving state (S1) to the controller state S2, the display content control unit 237-3 starts calculating the power consumption regarding the function of each of one or more network protocols. Moreover, at the time of transfer from the controller state (S2) to the normal power consumption state (S3), the display content control unit 237-3 ends the calculation of the power consumption.

According to the second aspect, it becomes possible to achieve an identical effect as the effect achieved according to the first aspect.

Third Aspect

As the third aspect, in the first aspect and the second aspect, the display content control unit 237-3 of the information processing device 2 calculates the following for each transfer factor: the first power consumption during the transfer from the power saving state (S1) to the controller state (S2); the second power consumption in the second power saving state; and the third power consumption during the transfer from the controller state (S2) to the normal power consumption state (S3) including the power saving state (S1).

According to the third aspect, it becomes possible to achieve an identical effect as the effect achieved according to the first aspect.

Fourth Aspect

As the fourth aspect, in any one aspect from the first aspect to the third aspect, the display content control unit 237-3 calculates the power consumption corresponding to each of one or more network protocols based on the cumulative time of the controller state (S2).

According to the fourth aspect, it becomes possible to achieve an identical effect as the effect achieved according to the first aspect.

Fifth Aspect

As the fifth aspect, in the fourth aspect, from the total of the power consumption calculated corresponding to each of one or more network protocols, the display content control unit 237-3 of the information processing device 2 calculates the daily power consumption.

According to the fifth aspect, in addition to achieving the effect achieved according to the first aspect, it becomes possible to present the user with more specific power consumption.

Sixth Aspect

As the sixth aspect, in the fifth aspect, the display content control unit 237-3 of the information processing device 2 displays, in the operation panel 211, the network energy-saving proposal screen 2111 that includes the daily power consumption calculated corresponding to each network protocol and includes such functions of each of one or more network protocols which become unavailable as a result of disabling the transfer to the controller state (S2).

According to the sixth aspect, in addition to achieving the effect achieved according to the first aspect, it becomes possible to prompt the user to avoid unnecessary restoration from energy saving.

Seventh Aspect

As the seventh aspect, in the sixth aspect, the display content control unit 237-3 of the information processing device 2 displays the daily power consumptions, which are included in the network energy-saving proposal screen 2111, in descending order of power consumptions.

According to the seventh aspect, in addition to achieving the effect achieved according to the sixth aspect, it becomes possible to make it easier for the information processing device 2 to achieve enhancement in the power saving effect.

Eighth Aspect

As the eighth aspect, in any one aspect from the first aspect to the seventh aspect, when the user logs into the information processing device 2 using the administrative right, the display content control unit 237-3 of the information processing device 2 displays the network energy-saving proposal screen 2111 in the operation panel 211.

According to the eighth aspect, the user having the user rights is allowed to perform a selection operation regarding enhancement in the power saving effect. Hence, the information processing device can be used in a safer and more reliable manner.

Ninth Aspect

As the ninth aspect, in any one aspect from the first aspect to the eighth aspect, the UI display unit (an example of a receiving unit, which is not mentioned again hereinafter) of the information processing device 2 receives, with respect to one or more checkboxes included in the network energy-saving proposal screen 2111 that is displayed, an operation for disabling the functions related to the transfer factor associated to each concerned checkbox.

According to the ninth aspect, in addition to achieving the effect achieved according to the first aspect, it becomes possible to prompt the user to avoid unnecessary restoration from energy saving.

10-th Aspect

As the 10-th aspect, the information processing system 1 (an example of an information processing system, which is not mentioned again hereinafter) includes: the information processing device 2 that has at least two power consumption states; and the management server 3 (an example of a management server, which is not mentioned again hereinafter) that is capable of communicating with the information processing device 2 via a communication network. The information processing device 2 includes: the display content control unit 237-3 (an example of a calculating unit, which is not mentioned again hereinafter) that, based on an energy-saving-restoration factor packet (an example of a predetermined transfer factor, which is not mentioned again hereinafter), after the transfer from the power saving state (S1) (an example of a first power consumption state, which is not mentioned again hereinafter) in which the power consumption is the lowest to the controller state (S2) (an example of a second power consumption state, which is not mentioned again hereinafter) in which the power consumption is higher than in the power saving state (S1), calculates, for each transfer factor, the power consumption till transfer to the normal power consumption state (S3) (an example of a different power consumption state, which is not mentioned again hereinafter) including the power saving state (S1); and a main system communication module 241 (an example of a sending unit, which is not mentioned again hereinafter) that sends, to the management server 3, power consumption information regarding the power consumption calculated corresponding to each transfer factor. The management server 3 includes: the transceiving unit 31 (an example of a receiving unit, which is not mentioned again hereinafter) that receives the power consumption information which corresponds to each transfer factor and which is sent by the information processing device 2; the generating unit 37 (an example of a generating unit, which is not mentioned again hereinafter) that generates screen information containing the power consumption indicated by the power consumption information which corresponds to each transfer factor and which is received from the information processing device 2, and containing one or more selecting parts for disabling the transfer to the controller state (S2) according to an energy-saving-restoration factor packet; and the transceiving unit 31 (an example of a sending unit, which is not mentioned again hereinafter) that sends the generated screen information to the information processing device 2.

According to the 10-th aspect, in addition to achieving the effect achieved according to the first embodiment, as a result of generating a UI screen regarding the energy saving proposal in the management server 3, it becomes possible to reduce the processing load of the information processing device 2.

11-th Aspect

As the 11-th aspect, an information processing method that is implemented in an information processing device having at least two power consumption states (an example of an information processing device, which is not mentioned again hereinafter) includes: calculating that, based on an energy-saving-restoration factor packet (an example of a predetermined transfer factor, which is not mentioned again hereinafter), after the transfer from the power saving state (S1) (an example of a first power consumption state, which is not mentioned again hereinafter) in which the power consumption is the lowest to the controller state (S2) (an example of a second power consumption state, which is not mentioned again hereinafter) in which the power consumption is higher than in the power saving state (S1), includes calculating, for each transfer factor, the power consumption till transfer to the normal power consumption state (S3) (an example of a different power consumption state, which is not mentioned again hereinafter) including the power saving state (S1); and display-controlling that includes displaying, in the operation panel 211 (an example of a display unit, which is not mentioned again hereinafter), the network energy-saving proposal screen 2111 that includes the power consumption calculated corresponding to each transfer factor and includes one or more checkboxes (an example of selecting parts, which are not mentioned again hereinafter) for disabling the transfer to the controller state (S2) due to the transfer factors.

According to the 11-th aspect, in an identical manner to the first aspect, in the case of transfer from the first power consumption state, in which the power consumption is the lowest, to the second power consumption state in which the power consumption is higher than in the first power consumption state, it becomes possible to disable the transfer to the second power state depending on the transfer factor.

12-th Aspect

As the 12-th aspect, a computer program causes an information processing device, which has at least two power consumption states (an example of an information processing device, which is not mentioned again hereinafter), to execute: calculating that, based on an energy-saving-restoration factor packet (an example of a predetermined transfer factor, which is not mentioned again hereinafter), after the transfer from the power saving state (S1) (an example of a first power consumption state, which is not mentioned again hereinafter) in which the power consumption is the lowest to the controller state (S2) (an example of a second power consumption state, which is not mentioned again hereinafter) in which the power consumption is higher than in the power saving state (S1), includes calculating, for each transfer factor, the power consumption till transfer to the normal power consumption state (S3) (an example of a different power consumption state, which is not mentioned again hereinafter) including the power saving state (S1); and display-controlling that includes displaying, in the operation panel 211 (an example of a display unit, which is not mentioned again hereinafter), the network energy-saving proposal screen 2111 that includes the power consumption calculated corresponding to each transfer factor and includes one or more checkboxes (an example of selecting parts, which are not mentioned again hereinafter) for disabling the transfer to the controller state (S2) due to the transfer factors.

According to the 12-th aspect, in an identical manner to the first aspect, in the case of transfer from the first power consumption state, in which the power consumption is the lowest, to the second power consumption state in which the power consumption is higher than in the first power consumption state, it becomes possible to disable the transfer to the second power state depending on the transfer factor.

As explained above, according to the present invention, in the case of transfer from the first power consumption state, in which the power consumption is the lowest, to the second power consumption state in which the power consumption is higher than in the first power consumption state, it becomes possible to disable the transfer to the second power state depending on the transfer factor.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

What is claimed is:

1. An information processing device having at least two power consumption states, comprising:

circuitry configured to:

after transfer based on a predetermined transfer factor from among a plurality of transfer factors, from a first power consumption state in which power consumption is lowest to a second power consumption state in which power consumption is higher than in the first power consumption state, calculate power consumption until transfer to a different power consumption state including the first power consumption state due to the predetermined transfer factor;

calculate the power consumptions for each function among a plurality of functions of one or more network protocols, based on a cumulative time of the second power consumption state; and display, in a display, a screen including power consumption calculated corresponding to the predetermined transfer factor, and one or more selecting parts for disabling transfer to the second power consumption state due to the predetermined transfer factor.

2. The information processing device according to claim 1, wherein each transfer factor among the plurality of transfer factors includes a packet for causing a network protocol of one or more network protocols used by the information processing device, to function, and the circuitry is configured to:

start calculating power consumptions for each function among a plurality of functions of the one or more network protocols, at time of transfer from the first power consumption state to the second power consumption state; and end calculation of the power consumptions, at time of transfer from the second power consumption state to the different power consumption state.

3. The information processing device according to claim 1, wherein the circuitry is configured to calculate for each of the plurality of transfer factors:

a first power consumption during transfer from the first power consumption state to the second power consumption state, a second power consumption in the second power consumption state, and a third power consumption during transfer from the second power consumption state to the different power consumption state including the first power consumption state.

4. The information processing device according to claim 1, wherein the circuitry is configured to:

calculate daily power consumptions, from totals of the power consumptions each calculated corresponding to one of the one or more network protocols.

5. The information processing device according to claim 4, wherein the circuitry is configured to:

display, in the display, a screen including the daily power consumptions each calculated corresponding to one of the one or more network protocols.

6. The information processing device according to claim 5, wherein the circuitry is configured to:

display, in the display, a screen including a function which becomes unavailable as a result of disabling transfer to the second power consumption state, for each of the one or more network protocols.

7. The information processing device according to claim 5, wherein the circuitry is configured to:

display the daily power consumptions included in the screen, in descending order of the daily power consumptions.

8. The information processing device according to claim 1, wherein the circuitry is configured to:

display the screen in the display in response to a user logging into the information processing device using an administrative right.

9. The information processing device according to claim 1, wherein the circuitry is further configured to:

receive, with respect to the one or more selecting parts included in the displayed screen, an operation for disabling a function related to each transfer factor among the plurality of transfer factors associated to a selecting part of the one or more selecting parts.

10. The information processing device according to claim 1, wherein:

the plurality of transfer factors includes a first transfer factor and a second transfer factor; and the circuitry is configured to after transfer based on the first transfer factor, from the first power consumption state to the second power consumption state, calculate power consumption until transfer to a different power consumption state including the first power consumption state due to the first transfer factor;

after transfer based on the second transfer factor, from the first power consumption state to the second power consumption state, calculate power consumption until transfer to a different power consumption state including the first power consumption state due to the second transfer factor; and display, in the display, a screen including power consumption calculated corresponding to each of the first transfer factor and the second transfer factor;

a first selecting part for disabling transfer to the second power consumption state due to the first transfer factor; and a second selecting part for disabling transfer to the second power consumption state due to the first transfer factor.

11. An information processing system comprising:

the information processing device according to claim 1; and a management device capable of communicating with the information processing device via a communication network, wherein the circuitry is further configured to send, to the management device, power consumption information regarding the power consumption calculated corresponding to the predetermined transfer factor from among the plurality of transfer factors, and the management device includes circuitry configured to receive the power consumption information sent by the information processing device;

generate screen information containing power consumption indicated by the received power consumption information, and one or more selecting parts for disabling transfer to the second power consumption state due to the predetermined transfer factor among the plurality of transfer factors; and send the generated screen information to the information processing device.

12. An information processing method implemented in an information processing device having at least two power consumption states, the information processing method comprising:

after transfer based on a predetermined transfer factor from among a plurality of transfer factors, from a first power consumption state in which power consumption is lowest to a second power consumption state in which power consumption is higher than in the first power consumption state, calculating power consumption until transfer to a different power consumption state including the first power consumption state due to the predetermined transfer factor;

calculating the power consumptions for each function among a plurality of functions of one or more network protocols, based on a cumulative time of the second power consumption state; and displaying, in a display, a screen including power consumption calculated corresponding to the predetermined transfer factor, and one or more selecting parts for disabling transfer to the second power consumption state due to the predetermined transfer factor.

13. The information processing method according to claim 12, wherein:

the plurality of transfer factors includes a first transfer factor and a second transfer factor; and the method further includes steps of after transfer based on the first transfer factor, from the first power consumption state to the second power consumption state, calculate power consumption until transfer to a different power consumption state including the first power consumption state due to the first transfer factor;

after transfer based on the second transfer factor, from the first power consumption state to the second power consumption state, calculate power consumption until transfer to a different power consumption state including the first power consumption state due to the second transfer factor; and display, in the display, a screen including power consumption calculated corresponding to each of the first transfer factor and the second transfer factor;

a first selecting part for disabling transfer to the second power consumption state due to the first transfer factor; and a second selecting part for disabling transfer to the second power consumption state due to the first transfer factor.

14. A non-transitory computer-readable medium including programmed instructions that cause a computer of an information processing device having at least two power consumption states, to execute:

after transfer based on a predetermined transfer factor from among a plurality of transfer factors, from a first power consumption state in which power consumption is lowest to a second power consumption state in which power consumption is higher than in the first power consumption state, calculating power consumption until transfer to a different power consumption state including the first power consumption state due to the predetermined transfer factor;

calculating the power consumptions for each function among a plurality of functions of one or more network protocols, based on a cumulative time of the second power consumption state; and displaying, in a display, a screen including power consumption calculated corresponding to the predetermined transfer factor, and one or more selecting parts for disabling transfer to the second power consumption state due to the predetermined transfer factor.

15. The non-transitory computer-readable medium according to claim 14, wherein:

the plurality of transfer factors includes a first transfer factor and a second transfer factor; and the computer of the information processing device further configured to execute:

after transfer based on the first transfer factor, from the first power consumption state to the second power consumption state, calculate power consumption until transfer to a different power consumption state including the first power consumption state due to the first transfer factor;

after transfer based on the second transfer factor, from the first power consumption state to the second power consumption state, calculate power consumption until transfer to a different power consumption state including the first power consumption state due to the second transfer factor; and display, in the display, a screen including power consumption calculated corresponding to each of the first transfer factor and the second transfer factor;

a first selecting part for disabling transfer to the second power consumption state due to the first transfer factor; and a second selecting part for disabling transfer to the second power consumption state due to the first transfer factor.

* * * * *